United States Patent [19]

Morris

[11] Patent Number: 5,073,849

[45] Date of Patent: Dec. 17, 1991

[54] RESONANT DC TO DC CONVERTER SWITCHING AT ZERO CURRENT

[75] Inventor: George Q. Morris, Thousand Oaks, Calif.

[73] Assignee: Power-One, Inc., Camarillo, Calif.

[21] Appl. No.: 423,720

[22] Filed: Oct. 18, 1989

Related U.S. Application Data

[63] Continuation-in-part of Ser. No. 286,991, Dec. 20, 1988, abandoned.

[51] Int. Cl.⁵ .................... H02M 3/335; H02M 3/337
[52] U.S. Cl. ........................................ 363/21; 363/24; 363/131; 363/134
[58] Field of Search ...................... 363/16, 17, 20, 21, 363/24, 131, 132, 134

[56] References Cited

U.S. PATENT DOCUMENTS

| | | | |
|---|---|---|---|
| 4,210,858 | 7/1980 | Ford et al. | 363/24 |
| 4,410,936 | 10/1983 | Suzuki | 363/80 |
| 4,415,959 | 11/1983 | Vinciarelli | 363/21 |
| 4,675,797 | 6/1987 | Vinciarelli | 363/21 |
| 4,709,316 | 11/1987 | Ngo et al. | 363/21 |
| 4,774,649 | 9/1988 | Archer | 363/20 |
| 4,785,387 | 11/1988 | Lee et al. | 363/131 |
| 4,791,542 | 12/1988 | Piaskowski | 363/17 |
| 4,802,080 | 1/1989 | Bossi et al. | 363/20 |

OTHER PUBLICATIONS

Dobberstein, "Very High Frequency FM-Regulated Power Supply with Enhanced Output Power Capability," IBM Tech. Discl. Bul., vol. 27, No. 9, pp. 5419-5421, Feb. 1985.
Chryssis, George, "High-Frequency Switching Power Supplies, Theory and Design," McGraw Hill, 1984, pp. 11-13.
Pitel, Ira J., "Phase-Modulated Resonant Power Conversion Techniques. . . ," IEEE Transactions, vol. IA-22, No. 6, Nov./Dec. 1986, pp. 1044-1051.
Young, Sean, "High Frequency Resonant Converter Using Power MOSFETS," High Frequency Power Conversion (HFPC) Proceedings, May 1986, pp. 21-35.
Borges, Beatriz et al., "HF-Resonant Bridge Converter," High Frequency Power Conversion Proceedings, May, 1986, pp. 177-185.
Carsten, Bruce, "A Hybrid Series-Parallel Resonant Converter for High Frequencies and Power Levels," HFPC Proceedings, Apr. 1987, pp. 41-47.
Jovanovic, Milan M. et al., "Design Aspects for High--Frequency Off-Line Quasi-Resonant Converters," HFPC Proceedings, Apr. 1987, pp. 83-85.
Ngo, KDT et al., "A High-Density Resonant Power Supply Using High-Voltage IC," HFPC Proceedings, Apr. 1987, pp. 244-257.
Lee, Fred, "Introduction to Resonant Power Converter Design," Seminar, Feb. 1987, Portions of Chapters 4 and 5.
Steigerwald, R. L., "A Comparison of Half-Bridge Resonant Converter Topologies," IEEE Applied Power Electronics Conference, Mar. 1987, pp. 135-144.
Johnson, S. D. et al., "A Comparison of Resonant Topologies in High Voltage DC Applications," IEEE Applied Power Electronics Conference, Mar. 1987, pp. 145-156.
Jovanovic, Milan M., "A Zero-Current-Switched Off-Line Quasi-Resonant Converter with Reduced Frequency Range," HFPC Proceedings, May 1988, pp. 15-24.

Primary Examiner—William H. Beha, Jr.
Attorney, Agent, or Firm—Koppel & Jacobs

[57] ABSTRACT

A novel resonant DC-to-DC converter has a source of direct current which is switched through a primary inductor, or the primary winding of a transformer in a primary circuit, to provide energy to an LC tank circuit. The sinusoidal, AC tank voltage is impressed upon an output winding that feeds an output smoothing inductor through a full wave rectifier. The resultant direct current output is made availabe to a load. A unidirectional switch operates in response to a switch control to perform the switching in the primary circuit at near zero current conditions. The switch control opens the unidirectional switch to end the current pulse. The length of the current pulse is proportional to the magnitude of the load.

25 Claims, 26 Drawing Sheets

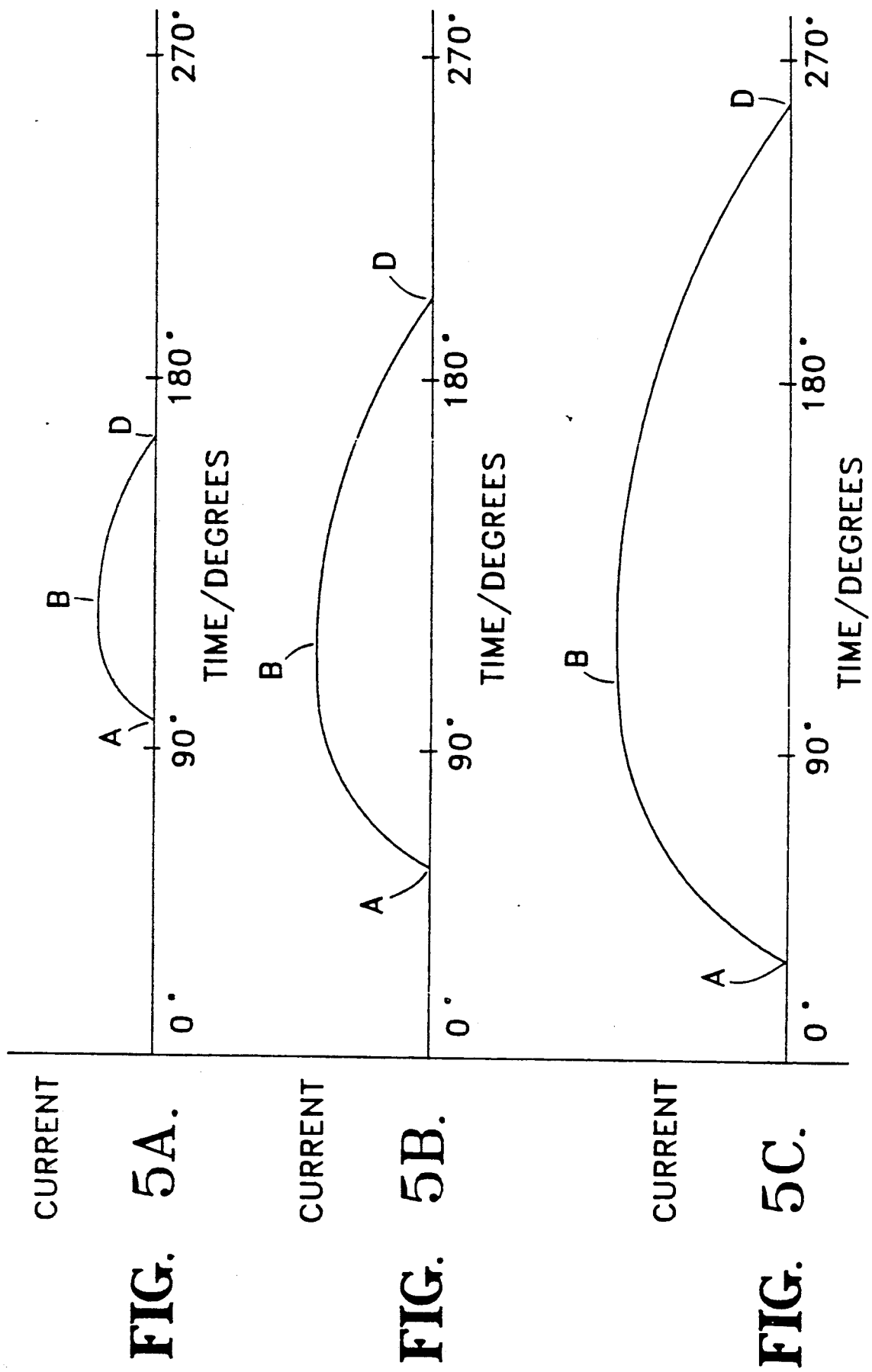

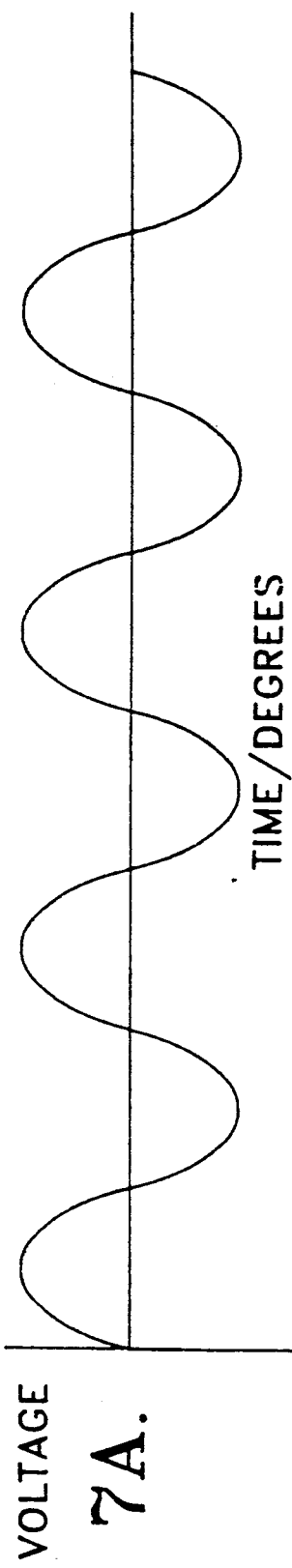
FIG. 7A. VOLTAGE
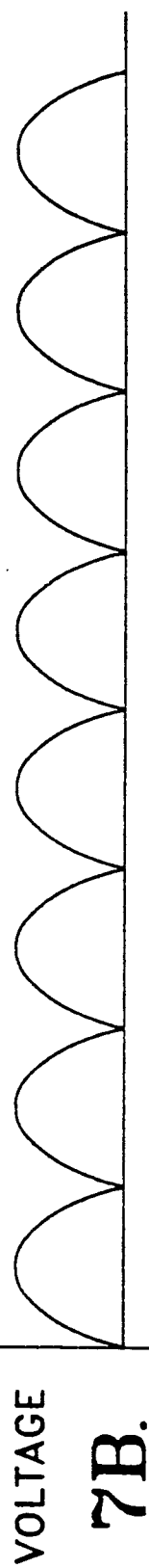
FIG. 7B. VOLTAGE
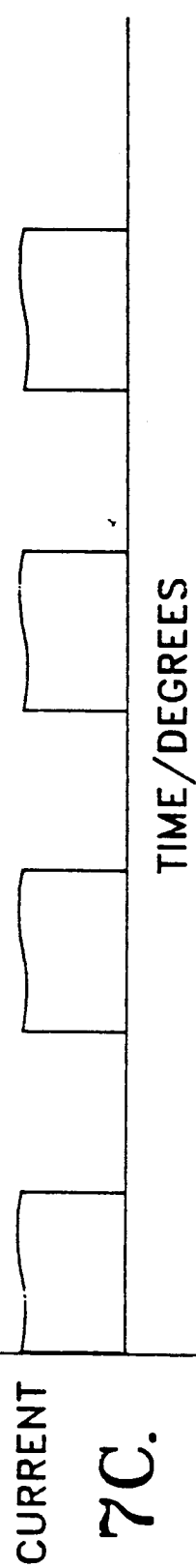
FIG. 7C. CURRENT
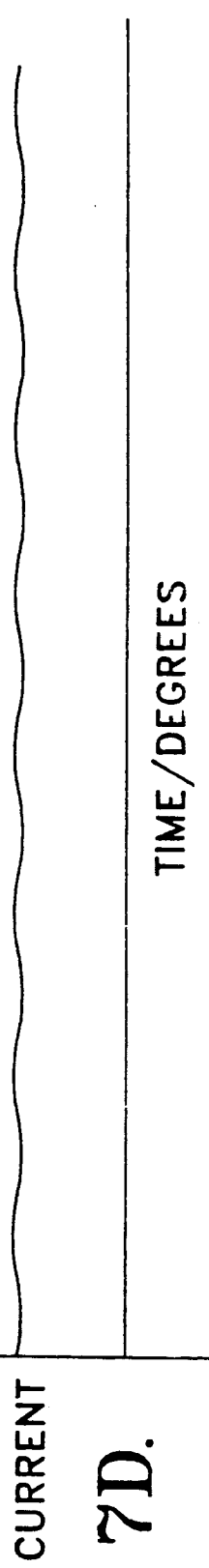
FIG. 7D. CURRENT

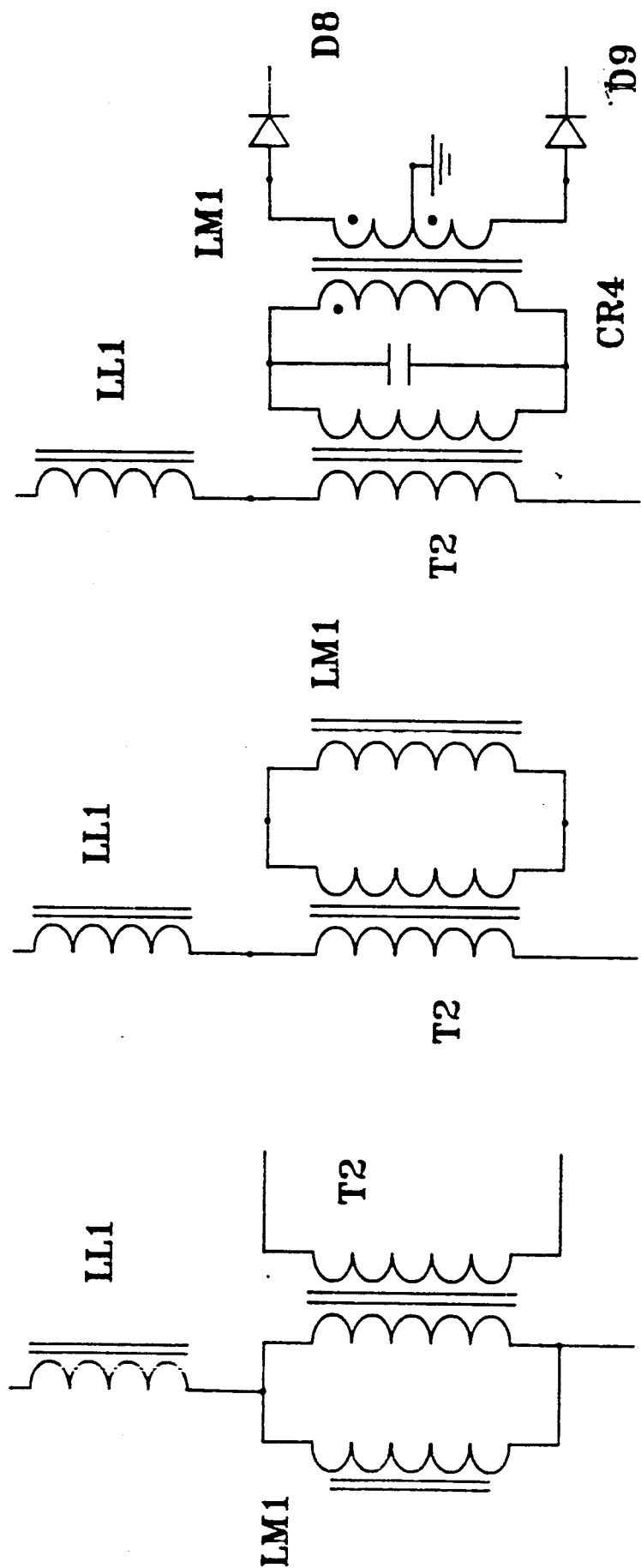

RESONANT DC TO DC CONVERTER SWITCHING AT ZERO CURRENT

CROSS REFERENCE TO RELATED APPLICATION

This application is a continuation-in-part of U.S. patent application Ser. No. 286,991, filed Dec. 20, 1988 now abandoned.

BACKGROUND OF THE INVENTION

1. Field of the Invention

This invention relates to DC-to-DC power converters, and more particularly to resonant power converters of the series-parallel type.

2. Description of the Prior Art

Various DC-to-DC power converters are available for transforming an input DC voltage of one magnitude to an output DC voltage with a different magnitude. Two conventional converter topologies are referred to as the flyback and the forward converters. They are discussed, for example, in a text by George Chryssis, "High-Frequency Switching Power Supplies: Theory and Design", Mc-Graw-Hill Book Company, 1984, pages 11-13.

With a flyback converter, a switch is connected in series with the input winding of a transformer. The switch is alternately turned on and off, producing a pulsing in the secondary winding which is fed through a diode to charge an output capacitor. When the primary current is switched off, the current in the secondary tends to surge. The rates of change of both the primary and secondary currents are very high, leading to electromagnetic interference and radio frequency interference. Complex filters are required to suppress the interference, thereby increasing the complexity and cost of the system and reducing its efficiency.

In the forward converter design an inductor is added to the secondary circuit to reduce the absolute current magnitude in the secondary, while a second diode in the secondary circuit closes a circuit between the output capacitor and inductor when the input switch is off. This design uses a high input current, which is stressful for the switching transistor in the primary circuit. The output diode is stressed by a large voltage in the current swings, requiring a snubber circuit which adds to the cost and complexity of the system and is an interference source. The large rates of current change in the transformer windings and in the inductor produce electromagnetic and radio frequency interference, which again require complex filters to remove.

Many of the problems associated with flyback and forward converter designs are resolved by the more recent "resonant" converter, which is exemplified in U.S. Pat. No. 4,415,959 to Vinciarelli. In this type of device, the most relevant embodiment of which is shown in FIG. 4 of the patent, a relatively large inductor acts as a current sink in the secondary circuit. A capacitor in the secondary circuit cooperates with the leakage inductance of the transformer to establish an effective LC circuit; this defines a characteristic time scale for the rise and fall of current from the DC voltage source. A switch device in the primary circuit can thus be switched on and off at essentially zero current, thereby overcoming the problems in both the flyback and forward converters associated with switching under high current levels. Following each cycle the energy stored in the capacitor is released by the current sink. After the capacitor has been discharged, the sink current is carried by a diode connected in parallel with the capacitor.

There are three basic types of resonant converters which may be used for high frequency switching power supply applications, namely, the series, parallel and combination series-parallel types. In a typical series type resonant converter, one or more resonant capacitors is in series with the primary inductor or primary winding of a transformer in the resonating LC tank circuit. In the parallel converter type, the resonant capacitor is in parallel with the primary inductor or primary winding to form the tank circuit; any input capacitors serve only to split the input DC voltage. The series-parallel resonant converter has both series resonant and parallel resonant capacitors. A detailed analysis of characteristics of each of these three types of resonant converters is found, for example, in the paper by R. L. Steigerwald entitled "A Comparison of Half-Bridge Resonant Converter Topologies", presented at the Second Annual IEEE Applied Power Electronics Conference and Exposition, Mar. 2-6, 1987.

Each of these resonant converter types has certain advantages and disadvantages. A main advantage of the series resonant converter is that conduction and other losses decrease at lighter loads, thereby achieving a high efficiency over a wide load range. In the series converter the load current is proportional to the current flowing through the resonant tank circuit components and the switching devices. A full bridge implementation of the series resonant converter may be made for high power applications without complicated circuitry since the resonant series capacitor prevents DC voltage from building up across the isolation transformer.

A primary disadvantage of the series resonant converter is that the output cannot be regulated at no-load conditions over the practical frequency range for the preferred above-resonant frequency operation. The output filter capacitor has to be large to carry a high value of ripple current since the ripple current is equal to 48% of the output current. This large capacitor conflicts with the objective of size reduction in high frequency power supplies for modern applications. Also, a series resonant converter may not be desirable for applications having severe short-circuit and high output current requirements. A short-circuit at the output results in a very high, undesirable switch current unless the switching frequency is raised sufficiently.

One advantage of the parallel resonant converter is that it can regulate its output voltage at no-load conditions by raising the switching frequency. Although a parallel resonant converter needs an inductor and a capacitor for filtering, the overall filter size is much smaller than that of a series resonant converter because the capacitor carries a low ripple current.

A disadvantage of the parallel resonant converter is that the magnitudes of the currents in the switches and resonant tank circuit components are relatively independent of the load. Moreover, these currents increase as the input voltage increases. Efficiency of the converter is thus diminished at light load or high line voltage conditions because the power loss stays the same or even increases while the output power decreases. A parallel resonant converter is therefore more suitable when the load or line voltage varies over a narrow range.

The combination series-parallel resonant converter has the advantages of both the series and parallel resonant converters without their disadvantages if the resonant components are properly chosen. It has been found that when the series resonant capacitor equals the parallel resonant capacitor, the efficiency remains constant over a wide load range, and the output current can be regulated at no-load conditions with a reasonable upper frequency. A series-parallel resonant converter with the series and parallel capacitors being equal takes on the characteristics of a series resonant converter while operating or departing from full load. The power loss decreases with load by several orders of magnitude before it stops decreasing as the parallel resonant characteristic of the converter takes over to keep the output regulated at no-load conditions. These and other features of the series-parallel resonant converter are found in a paper by K. D. T. Ngo and R. L. Steigerwald et al. entitled "A High-Density Power Supply Using High Voltage IC", presented at the 1987 High Frequency Power Conversion International Conference in Washington, D.C., April, 1987.

To reduce the size of power supplies intended for use in modern systems, it is desirable to raise the operating frequency of the converter. This in turn reduces the size of the reactive components, resulting in an overall size reduction of the converter. However, the increase of switching frequencies has a tendency to increase electromagnetic interference emissions from the converter, requiring additional filter circuitry to remove the emissions. It is therefore desirable to reduce the size of the reactive components in a high frequency converter while at the same time reducing the emission of electromagnetic interference signals.

U.S. Pat. No. 4,791,542, issued Dec. 13, 1988, to A. Piaskowski, entitled "FERRORESONANT POWER SUPPLY AND METHOD", discloses a resonant power converter including a transformer provided with bias windings which enable modulation of the primary inductance of the transformer by controlled saturation of its core. The converter includes switching transistors driven by an oscillator which generates a fixed frequency signal under all operating conditions of the device.

Another pertinent reference is found in IBM Technical Disclosure Bulletin, vol. 27, no. 9, (February 1985) to E. Dobberstein, entitled "VERY HIGH FREQUENCY FM-REGULATED POWER SUPPLY WITH ENHANCED OUTPUT POWER CAPABILITY". This device includes a series resonant circuit, an output of which is inductively coupled to a rectifier stage by a transformer. The transformer primary winding has a value of inductance which is negligible compared to the value of the series inductor, and therefore does not produce a significant frequency shift in the series resonant circuit. The power supply offers enhanced power output capability by placing capacitors across the switching devices of the supply, thereby greatly reducing the device power dissipation during the turn-off transient of the switching cycle.

SUMMARY OF THE INVENTION

In view of the above problems with the prior art, an object of the present invention is to provide a novel type of DC-to-DC converter in which primary side switching takes place at near zero current conditions to reduce the emission of interference signals and to lessen the stresses placed on the switching components.

Another object of the invention is to provide a novel resonant converter in which the primary circuit current has substantially sinusoidal shape, thereby reducing the emission of electromagnetic interference.

Another object is to provide a novel converter that is capable of powering a wide range of loads and easily accommodates multiple output ports.

Another object of the present invention is to reduce the size and expense of the converter's reactive elements to reduce the overall size and expense of the converter.

These and other objects of the invention are realized in a novel resonant DC-to-DC converter in which a source of direct current is switched through a primary inductor, or a primary winding of a transformer in a primary circuit, to provide energy to an AC resonant tank circuit in the form of a substantially sinusoidal waveform. The resonant tank circuit includes a resonant inductor having a primary inductive winding and a secondary inductive winding. The primary inductive winding is connected in parallel to a resonant capacitor. The AC tank voltage is impressed on the secondary inductive winding that feeds an output smoothing inductor through a full wave rectifier. The resultant direct current is made available to a load via an output terminal. A unidirectional switch operates in response to a switch control to perform the switching in the primary circuit at near zero current conditions. The sinusoidal output of the primary circuit reduces the emission of electromagnetic interference signals.

The switch control operates in response to the voltage across the primary inductor or primary winding, since this voltage is proportional to the magnitude of the load. The switch control determines the timing of current flow initiation from the primary circuit to the resonant tank circuit at the beginning of each tank voltage oscillation cycle by closing the bidirectional switch to begin the current pulse at a near zero current condition. The switch control closes the unidirectional switch when the voltage in the tank circuit is positive-going to achieve phase modulation. The switch is closed earlier, and remains closed longer, for larger loads. This arrangement permits the power output of the converter to be varied by phase modulation, which results in frequency modulation. The switch control opens the unidirectional switch to end the current pulse. The end of the current pulse is determined by the magnitude of the load and the presence of another near zero current condition in the switch. The opening of the switch at the end of the pulse results in unidirectional current flow, preventing current from flowing back through the primary inductor or primary winding in the direction toward the voltage source.

Various embodiments are discussed, including transformer-coupled, double-ended, multiple output, and regulated output voltage embodiments. At least one transformer-coupled embodiment, having an isolation transformer, may be implemented around a common ferrite E-core transformer to reduce the number of magnetic elements. A single-ended version using a primary inductor has an output frequency twice that of the primary circuit frequency, permitting a smaller and less expensive output inductor to be used.

These and other features and advantages of the invention will be apparent to those skilled in the art from the following detailed description of preferred embodiments, taken together with the accompanying drawings, in which:

DESCRIPTION OF THE DRAWINGS

FIG. 5A is a graph, corresponding to FIG. 4A, illustrating the current flow through the primary inductor;

FIG. 5B is a graph, corresponding to FIG. 4B, illustrating the current flow through the primary inductor;

FIG. 5C is a graph, corresponding to FIG. 4C, illustrating the current flow through the primary inductor;

FIG. 7A is a graph illustrating the tank output voltage of the first embodiment depicted in FIG. 2;

FIG. 7B is a graph illustrating the voltage input to the output inductor of FIG. 2;

FIG. 7C is a graph illustrating the current flow through diode D1 in FIG. 2;

FIG. 7D is a graph illustrating the current output of the output inductor in FIG. 2;

FIG. 15A is a schematic diagram depicting a typical prior art transformer;

FIG. 15B is a schematic diagram depicting the typical transformer of FIG. 15A, except that the magnetizing inductance has been moved to the secondary side;

FIG. 15C is a schematic diagram depicting the circuit of FIG. 15B, except that a resonating capacitor has been added in parallel with the magnetizing inductance of the transformer;

DETAILED DESCRIPTION OF PREFERRED EMBODIMENTS

Figure 1:
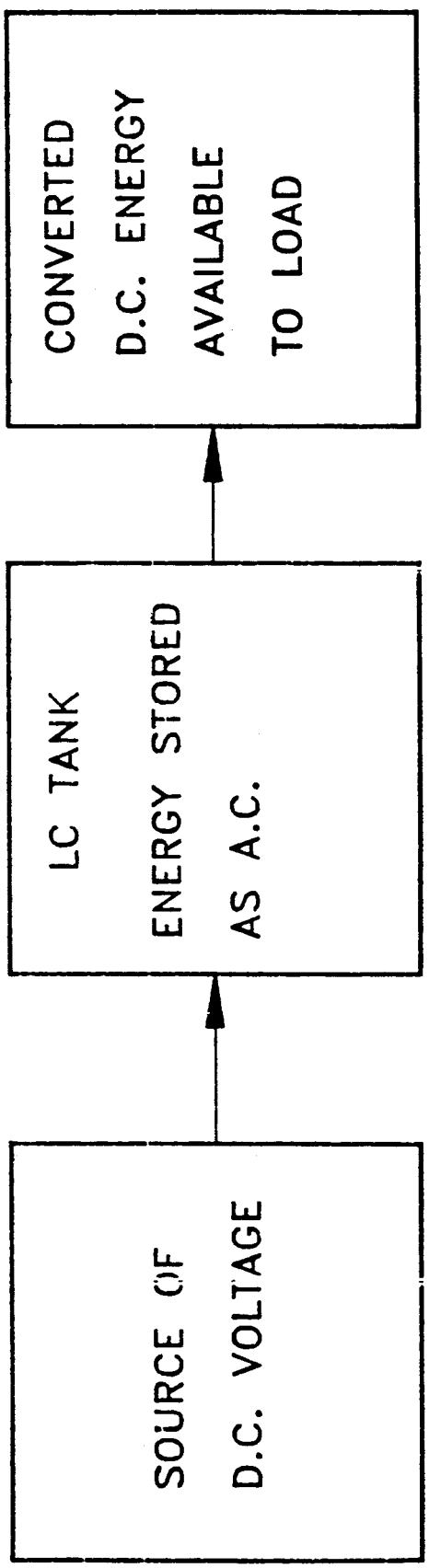
FIG. 1 is a block diagram illustrating the basic energy flow path of the present invention.

The resonant converter uses an inductor-capacitor (LC) resonant tank circuit to store energy and to provide a sinusoidal voltage. FIG. 1 is a block diagram illustrating the basic energy flow path of the present invention. A source of direct current, such as a battery, rectified AC mains voltage, or any other DC source is switched through a primary winding of a transformer to provide energy that is stored as alternating current in an LC resonant circuit. The AC resonant tank voltage is impressed on output windings, which feed an output smoothing inductor through a full-wave rectifier. The resultant direct current is made available to a load.

Figure 2:
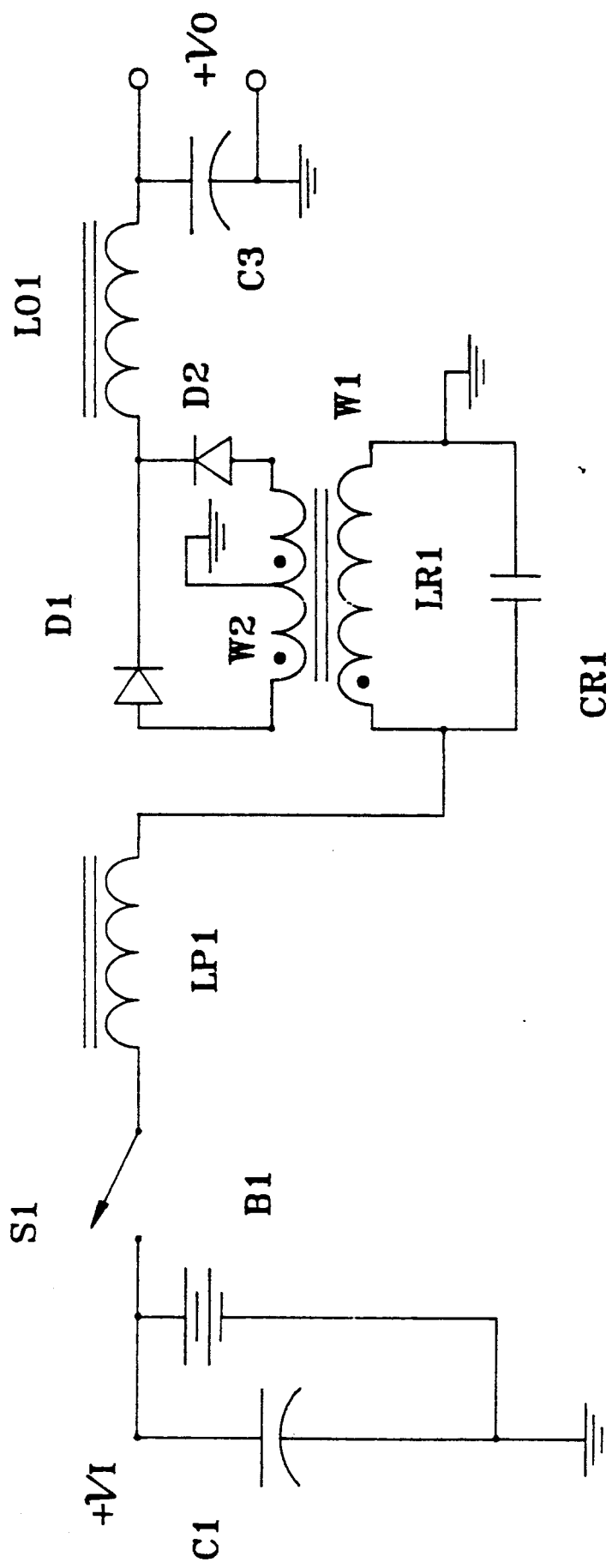
FIG. 2 is a schematic diagram of a first embodiment of the present invention.

FIG. 2 is a schematic diagram of a first embodiment of the present invention. In FIG. 2, battery B1 provides a source of DC energy. Capacitor C1 is a smoothing capacitor to reduce the alternating current stress on battery B1. The converter has a primary circuit consisting of a switch S1 in series with a primary inductor LP1. Switch S1 and inductor LP1 are in series with the parallel combination of resonating capacitor CR1 and resonating inductor LR1. Switch S1 can be opened and closed by a control means (not shown) to impress a battery voltage across the primary circuit. The primary inductor LP1 serves as an energy storage device for energy being transferred from the voltage source B1, and presents a reactive impedance to the voltage source B1.

The resonant tank circuit consists of the parallel combination of a resonating inductor LR1 and a resonating capacitor CR1. The tank stores energy as alternating current. By virtue of the tank's series connection with primary inductor LP1 and switch S1, the alternating voltage of the tank acts as a voltage source across the primary inductor LP1.

Output diodes D1 and D2 are connected with a center tapped secondary winding W2 on resonating inductor LR1. Output diodes D1 and D2 yield a full-wave rectified voltage to an output smoothing inductor LO1. Capacitor C3 is an energy storage capacitor for further smoothing of the output voltage that is present at the output terminal VO.

Figure 3:
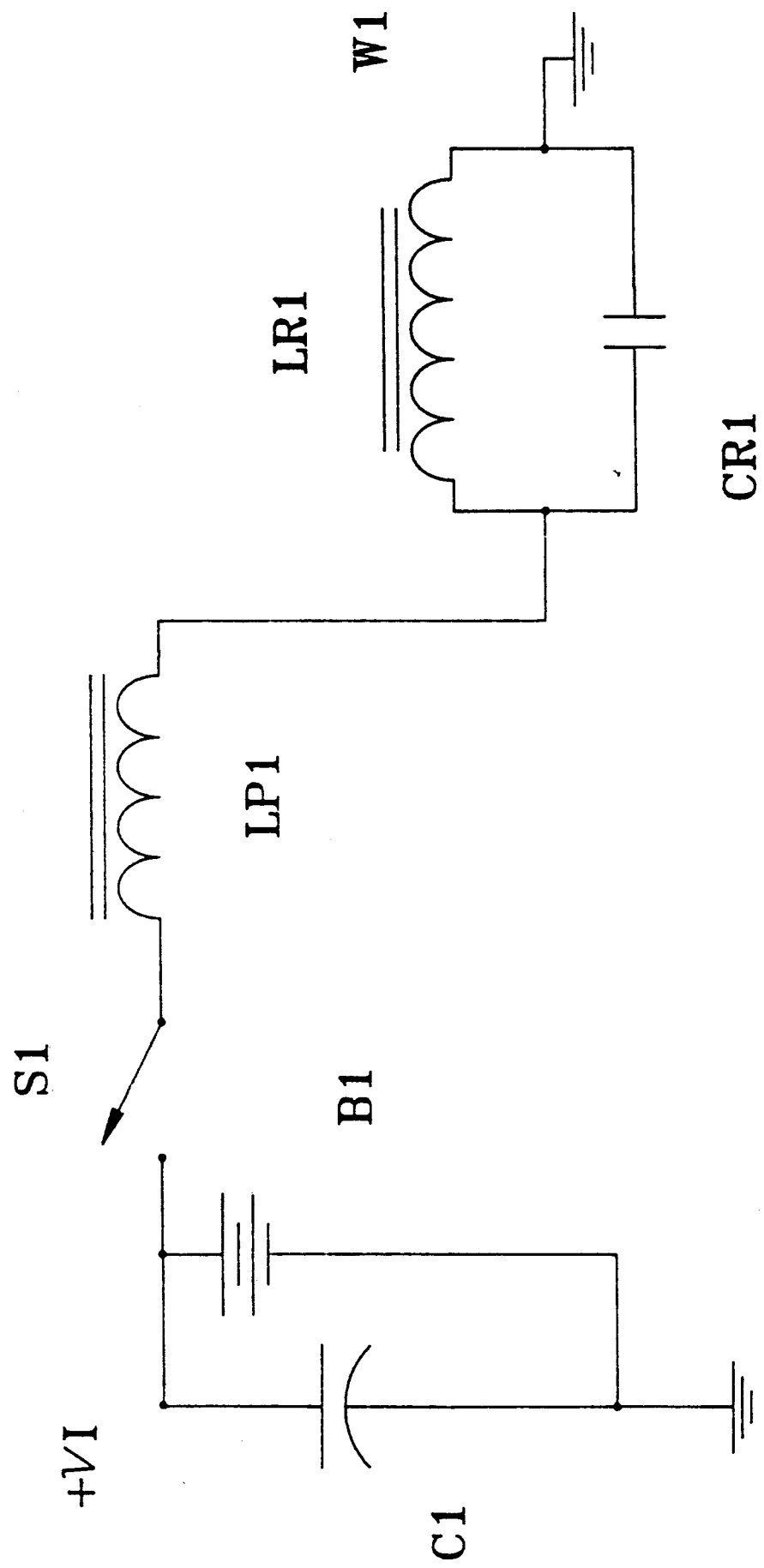
FIG. 3 is a schematic diagram of the same first embodiment depicted in FIG. 2, with the output portion of the circuit omitted.

FIG. 3 is a schematic diagram of the same first embodiment depicted in FIG. 2, except that the output portion of the circuit of FIG. 2 has been omitted from FIG. 3. A detailed description of the operation of the first embodiment will be given by referring to FIGS. 2 and 3. The steady-state operation will be discussed first.

In its steady-state operation, the tank circuit is resonating continuously with a peak voltage that is higher than the battery voltage VI. For the purpose of this description, assume that the peak tank voltage is two times the input voltage VI, and further assume that the tank has already been energized into its correct resonant condition.

Energy from the battery B1 is transferred to the tank through switch S1 and primary inductor LP1. Energy from the tank is then transferred to the output circuit via the full-wave rectifier comprised of diodes D1 and D2, and smoothing output inductor LO1.

Figure 4A:
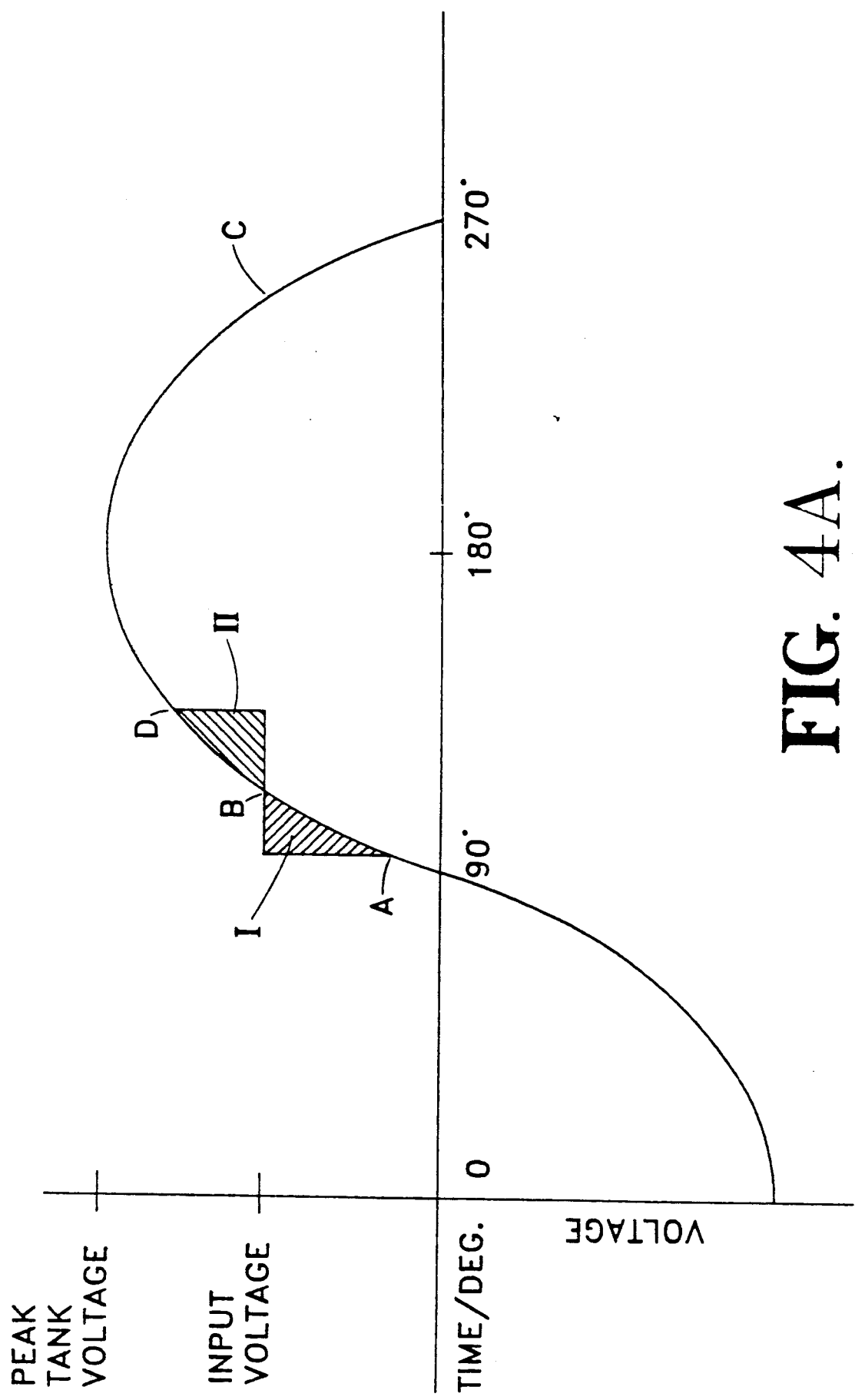
FIG. 4A is a graph illustrating the tank voltage of the first embodiment depicted in FIGS. 2 and 3 when a small amount of energy is transferred from the battery to the tank.
Figure 4B:
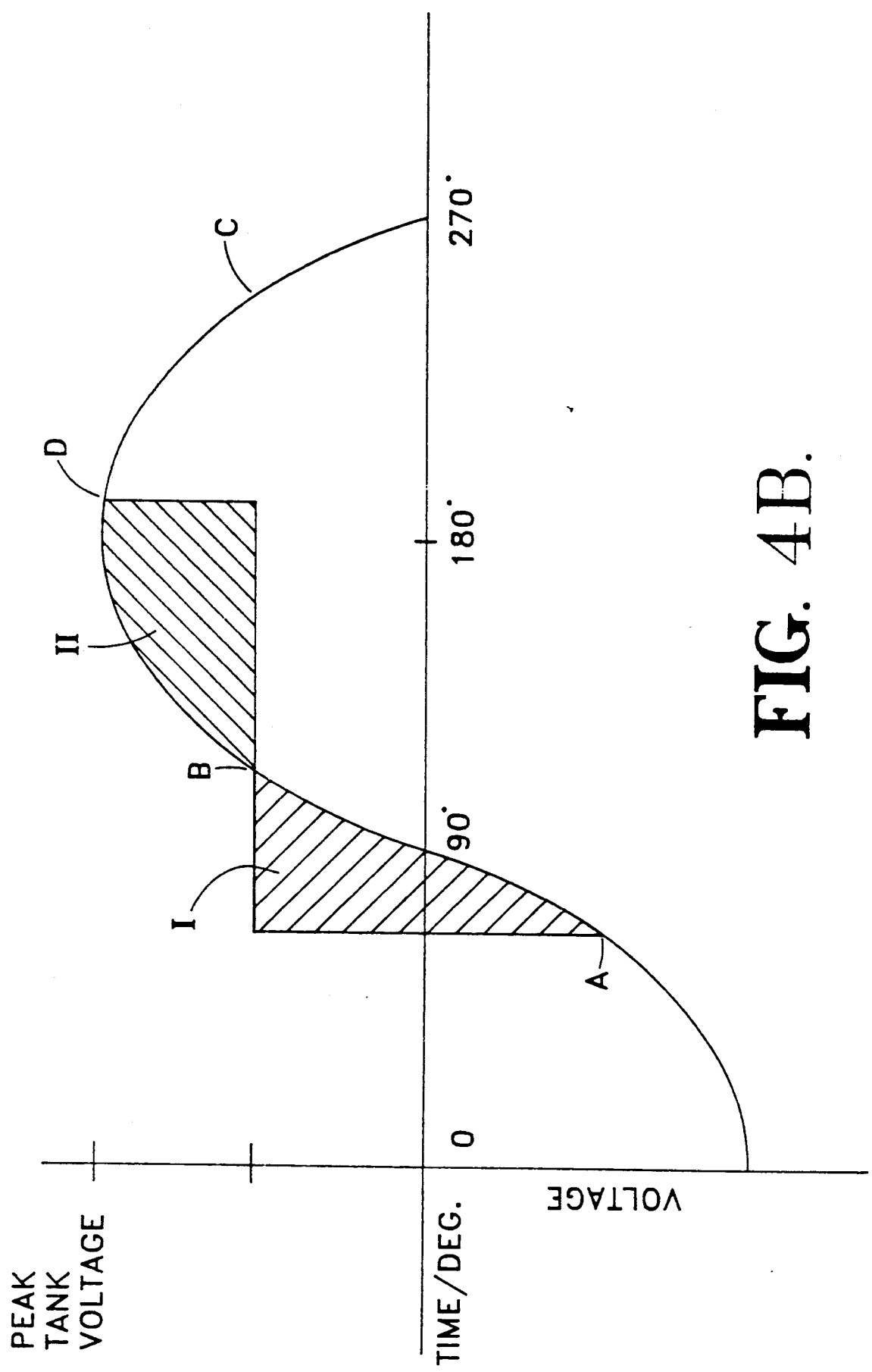
FIG. 4B is a graph illustrating the tank voltage of the first embodiment depicted in FIGS. 2 and 3 when a larger amount of energy is transferred from the battery to the tank.
Figure 4C:
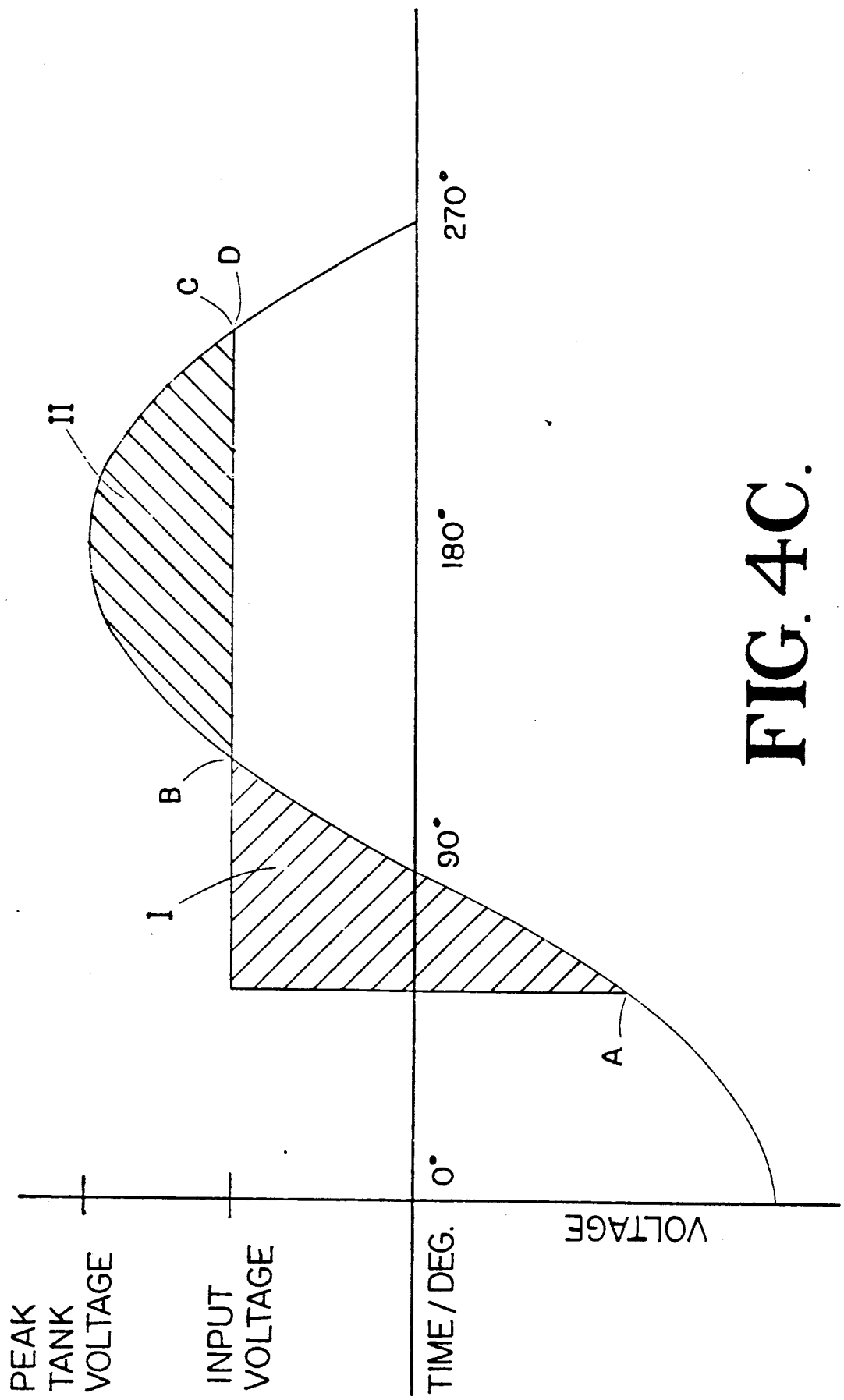
FIG. 4C is a graph illustrating the tank voltage of the first embodiment depicted in FIGS. 2 and 3 at maximum power transfer yet still operating the switch at zero current for both closing and opening.

FIGS. 4A-4C are graphs illustrating the tank voltage when varying amounts of energy are being transferred from the battery to the tank. In FIG. 4A, a small amount of energy is transferred. In FIG. 4B, a larger amount of energy is transferred, and in FIG. 4C the maximum amount of energy is being transferred. FIGS. 5A-5C are graphs that illustrate the current flow through the primary inductor for the differing amounts of energy transferred in FIGS. 4A-4C, respectively.

During steady-state operation, there are two sources of voltage for the primary circuit illustrated in FIG. 3: the battery voltage VI, and the tank voltage. The tank voltage alternates from positive to negative with respect to the current as the tank resonates. Primary inductor LP1 acts as the impedance of the primary circuit at the resonant frequency of the tank. Current can only flow in the primary circuit when switch S1 is closed. In operation, the closing and opening of switch S1 is related to the voltage of the tank as described below.

The operation of the circuit for a small amount of energy transferred and a light load will be first described with reference to FIGS. 3 and 4A. In FIG. 4A, the y-axis of the graph corresponds to the input voltage VI and the voltage of the tank. The x-axis corresponds to time and degrees radian. For the converter to operate, switch S1 is closed when the tank voltage is positive-going, but the tank voltage is still more negative than the positive input voltage VI. Point A in FIG. 4A corresponds to that point when switch S1 is closed. The closing of switch S1 completes the primary circuit. The voltage VI is present at the left-hand side of primary inductor LP1, and the tank voltage is then present at the right side of primary inductor LP1. There is a net voltage impressed across LP1 that is the difference between voltage VI and the tank voltage. In response to this voltage differential, current begins to flow through primary inductor LP1 from battery B1 into the tank. The rate of increase of this current flow is determined by the voltage and inductance of the primary inductor LP1. During the closure of switch S1, the tank progresses in its cycle of oscillation so that the tank voltage becomes increasingly more positive. The voltage difference across primary inductor LP1 thus decreases, so that the rate of increase of the current flow is reduced.

Point B in FIG. 4A is the point where the tank voltage is equal to the input voltage VI. Since the voltage across the primary inductor LP1 is zero at point B, the current flow does not increase any further.

As the tank progresses in its oscillation cycle, the tank voltage becomes more positive than the input voltage VI, so that the voltage across primary inductor LP1 reverses polarity. This polarity reversal opposes the flow of current that has been established in the primary inductor LP1. Current flow in primary inductor LP1 now begins to decrease until it becomes zero. The point of zero current flow corresponds to point D in FIG. 4A. At this point, switch S1 is opened immediately, or else current would begin to flow back from the tank circuit into the battery B1. Switch S1 should be a unidirectional switch to enable it to open or close whenever the current through the switch reaches zero. The unidirectional switch S1 enables current flow through the primary inductor LP1 only from the power source or battery B1 to the resonating inductor LR1.

FIG. 5A illustrates the current that is flowing through primary inductor LP1 for the light load condition described above. In FIG. 5A, the current increases from point A, corresponding to switch S1's closure, and has a slope proportional to the voltage difference across primary inductor LP1. The rate of increase of the current slows as the tank voltage becomes more positive until point B is reached, when the tank voltage equals the input voltage VI. The current reaches its maximum value at point B. As the tank voltage continues to increase, the current decreases at a rate proportional to the increasing difference between the tank voltage and input voltage VI. At point D, current through primary inductor LP1 returns to zero. The current waveform as depicted in FIG. 5A is essentially a portion of a sine wave, except for the asymmetry introduced by the asymmetrical voltage curve of FIG. 4A.

The result of the operation of the converter as described above is that a sinusoidal pulse of current flows from voltage source VI to the tank. This represents a transfer of energy from the voltage source into the tank. Assuming no other influences on the tank, this energy addition would manifest itself as an increase in the peak voltage of the tank.

During the operation described above, switch S1 was both closed and opened under conditions of zero current flow through the switch. This has the advantage of greatly reducing the stresses on the switch, which is particularly important when a transistor is incorporated into switch S1. The sinusoidal nature of the current flow has the advantage of reducing radio frequency emissions from the circuit.

A review of several principles of inductor current flow is helpful in explaining the voltage characteristics of the first embodiment of the invention. It is well known to those skilled in the art that the amount of current flowing in the windings of an inductor, and thus the amount of flux and stored energy, depends upon the volt-second product of any voltage across those windings. Applying this principle to the present invention, the primary inductor LP1 acts as the controlling impedance across which current flows in response to a voltage across the primary inductor. The voltage across the primary inductor is the difference between the input voltage VI and the tank voltage. The energy being transferred is temporarily stored in the primary inductor for the period of time that current is present in the primary inductor LP1. The amount of current in inductor LP1 is a measure of the volt-second product applied across inductor LP1 that causes the current to flow. The amount of energy transferred in one switching cycle of the tank depends upon the volt-seconds available to build up current in primary inductor LP1.

Another important principle of inductors is that any decrease in current and flux may only result from an equal and opposite volt-second product from that which decreased the flux. For the current to decrease from a given amount to zero in any inductor, a volt-second product must be applied that is equal in magnitude but opposite in sign from the volt-second product that caused the amount of current originally present.

Applying these principles to the waveform depicted in FIG. 4A, the shaded area indicated by I corresponds to the volt-second product applied across primary inductor LP1 from points A to B. At point B, the current reaches its peak, and decreases to zero between points B and D. The area designated II is the volt-second product applied across primary inductor LP1 from points B to D.

From the above discussion of the principles of energy storage and current change in inductors, it follows that the area of region I must equal the area of region II, and that the area of region I is a measure of the energy temporarily stored in primary inductor LP1. This energy corresponds to the energy transferred from battery B1 to the tank in one switching cycle of the converter. If points A and B are known, point D may be determined since the area of region I equals the area of region II.

The transfer of a larger amount of energy from battery B1 to the tank will be described with reference to FIGS. 3, 4B and 5B. In FIG. 4B, switch S1 is closed at point A on the tank voltage curve. The switch closure at point A is much sooner in the tank cycle than was the switch closure point A of FIG. 4A. This means that the initial difference between the tank voltage and the input voltage VI is larger for larger energy transfer and larger loads than for the smaller load illustrated in FIG. 4A.

In FIG. 4B, the current in primary inductor LP1 increases until the peak current in primary inductor LP1 occurs at point B, when the tank voltage equals input voltage VI. Region I is the volt-second product representing the energy stored in inductor LP1. Since switch S1 was closed earlier in the tank cycle when compared to the curve in FIG. 4A, both the initial voltage and the duration of current increase are greater than for FIG. 4A. The area of region I is thus greater, indicating that more energy is stored in primary inductor LP1 and that more energy is transferred in the switching cycle to the tank. Since region II in FIG. 4B is the same size as region I, region II is also proportionately larger than its counterpart in FIG. 4A.

The corresponding current waveform for this larger energy transfer is illustrated in FIG. 5B. The peak current and the duration of current flow are both greater than their counterparts in FIG. 4B, indicating that a larger transfer of energy occurred. The shape of the current waveform of FIG. 5B is generally sinusoidal, except that the initial positive slope at point A is somewhat steeper than the final negative slope at point D. Also, the duration in time or degrees between points A and B is shorter than a duration between points B and D.

The operation of the primary converter circuit will now be described when there is a maximum power transfer, yet where switch S1 is still opening and closing at zero current conditions.

In FIG. 4C, point C represents the latest time in the tank oscillation cycle that the tank voltage is greater than input voltage VI. Point C thus represents the latest time that switch S1 may remain closed and not have current in the primary circuit beginning to increase again. If the current in primary inductor LP1 has not decreased to zero by the time point C is reached, there will still be current in inductor LP1 when the switch is open. This forces the switch to open with some amount of current still flowing, requiring additional circuitry to accommodate the possible voltage stresses that may occur under these conditions.

In FIG. 4C, switch S1 is closed at point A and an amount of energy proportional to the volt-seconds product, represented by region I, is transferred to inductor LP1. Region II extends from points B to C in order to equal the area of region I. Since region II also extends to point D, it follows that point C occurs at point D when energy transfer is maximized while retaining zero current flow through switch S1 during its opening and closing.

As indicated above, switch S1 should preferably be a unidirectional switch so that current flows through primary inductor LP1 in a single direction. If switch S1 is not unidirectional, current may flow from the tank to the battery when the tank voltage is more positive than the input voltage VI. Energy is being transferred from the tank back to the battery if current flows from the tank to the battery. This reverse-transferred energy was once transferred out of the battery, so in effect this energy is being switched through the converter a number of times without being applied to a load. If a minimum energy transfer occurs as with a light load condition, it is conceivable that the amount of energy reverse-transferred out of the tank to the battery may exceed the amount of energy transferred from the battery to the tank, which would completely prevent the operation of the converter.

Figure 6:
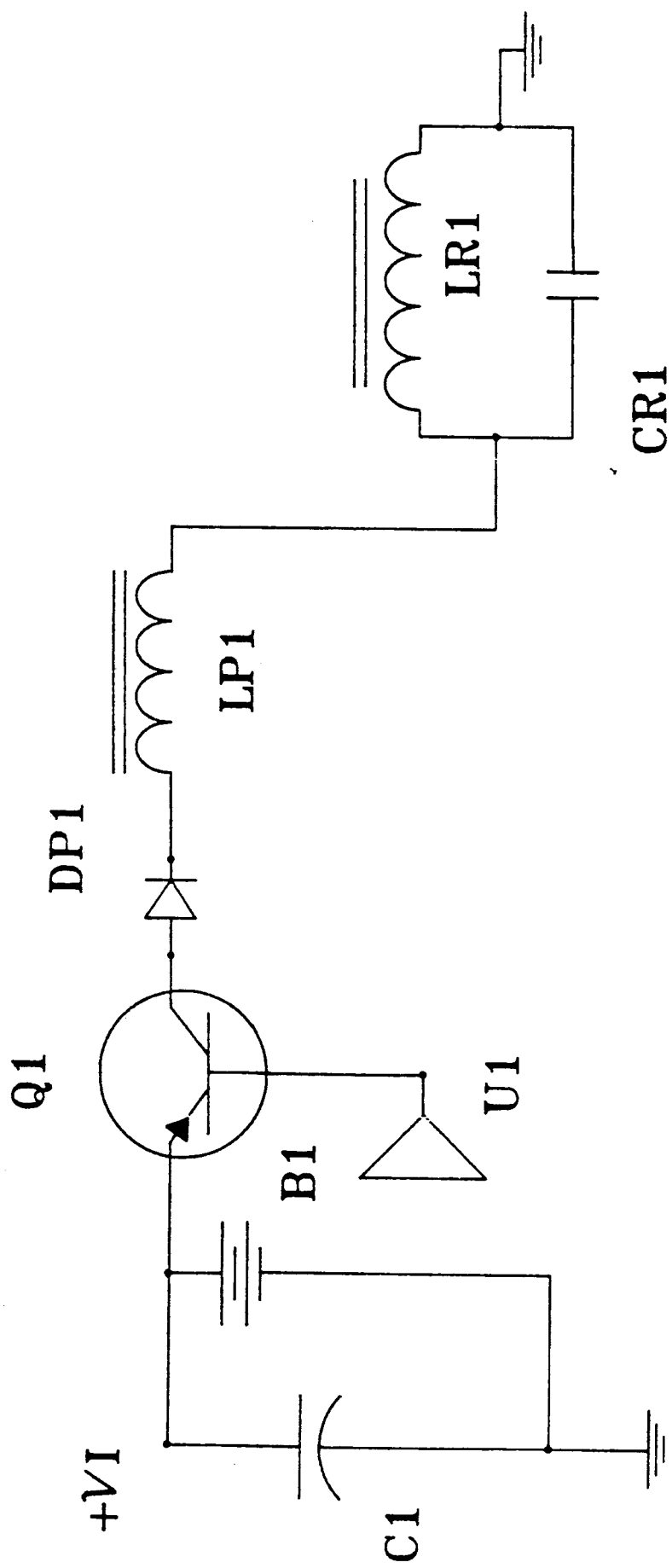
FIG. 6 is a schematic diagram of the first embodiment depicted in FIG. 3 using a bidirectional switch.

FIG. 6 is a schematic diagram of a practical implementation of the primary circuit depicted in FIG. 3. In FIG. 6, the unidirectional switch S1 is implemented with readily available electronic components, including transistor Q1 in series with a primary diode DP1. A functional block U1 represents the control for transistor Q1. Diode DP1 closes the switch whenever point D in FIGS. 4A–4C occurs before point C. In any event, control U1 must disable transistor Q1 no later than point C of FIGS. 4A–4C, or else current that cannot be naturally commutated by the tank voltage will begin to flow in inductor LP1.

The energy transfer from the DC source to the tank was described above. The energy transfer from the tank to the output terminals will now be described with reference to FIG. 2. In FIG. 2, a center-tapped secondary output winding W2 is provided on resonating inductor LR1. Output diode D1 is connected with one end of center-tapped winding W2, and output diode D2 is connected to the other end of winding W2. Together, diodes D1 and D2 form a conventional full-wave rectifier. The cathodes of diodes D1 and D2 are connected together, and are also connected to an output filter inductor LO1. The other side of inductor LO1 is connected to an output terminal at which the DC output of the converter is taken. The DC output return terminal is connected to circuit common. A capacitor C3 is connected across the output terminals to provide another smoothing filter. Inductor LO1 and capacitor C3 form a conventional LC output filter that is similar to those found on many so-called forward converters. The center-tapped output winding W2 is closely coupled to the primary inductor winding W1 on inductor LR1, so that the tank voltage is coupled to the two halves of output winding W2. Assuming a turns ratio of 1:1 between the tank winding W1 and each half of center-tapped output winding W2, a voltage will be induced on each half of output winding W2 that is equal to the tank voltage. During normal medium to full load operation, inductor LO1 operates in a continuous conduction mode, with current never declining to zero through the output inductor.

FIGS. 7A–7D depict various waveforms present in the output section of the converter. FIG. 7A depicts the output tank voltage. FIG. 7B corresponds to the voltage at the cathodes of diodes D1 and D2, and thus is also the input voltage to output inductor LO1. The full-wave rectification of the voltage is shown in FIG. 7B. The current waveform through diode D1 is shown in FIG. 7C; the current waveform through diode D2 is identical in shape to that depicted in 7C, but is 180° out of phase with the current in diode D1. The net result of the outputs of diodes D1 and D2 is the continuous current waveform output by inductor LO1 as illustrated in FIG. 7D. In the continuous conduction output mode of operation, this output voltage is the average voltage of the tank scaled by the turns ratio of the inductor to the output winding halves, which in this example was arbitrarily assumed to be 1:1. To achieve dynamic regulation of the output voltage, the current in output inductor LO1 should be changed. This current change results from a temporary change in the average voltage across inductor LO1. The tank peak voltage may be raised to increase inductor current, or it may be lowered to decrease inductor current.

Figure 8A:
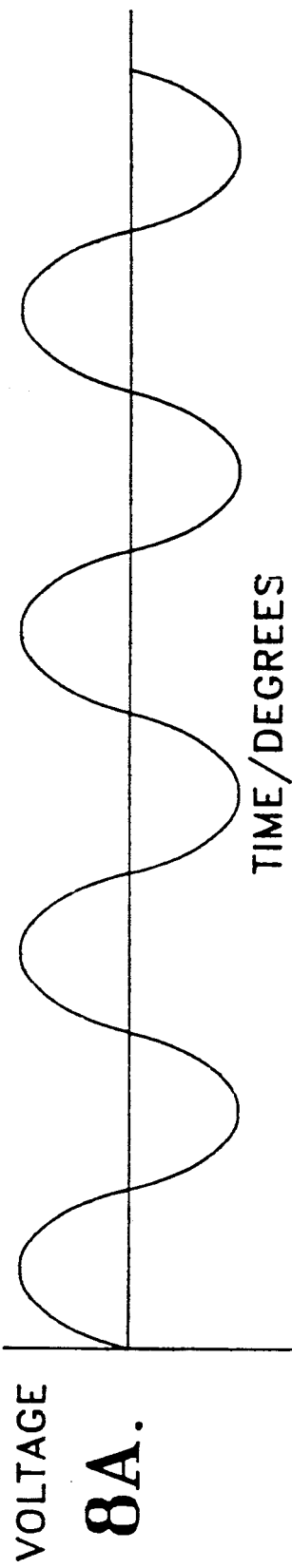
FIG. 8A is a graph illustrating the tank voltage of the first embodiment depicted in FIG. 2 when the converter is operated at light loads in the discontinuous output mode.
Figure 8B:
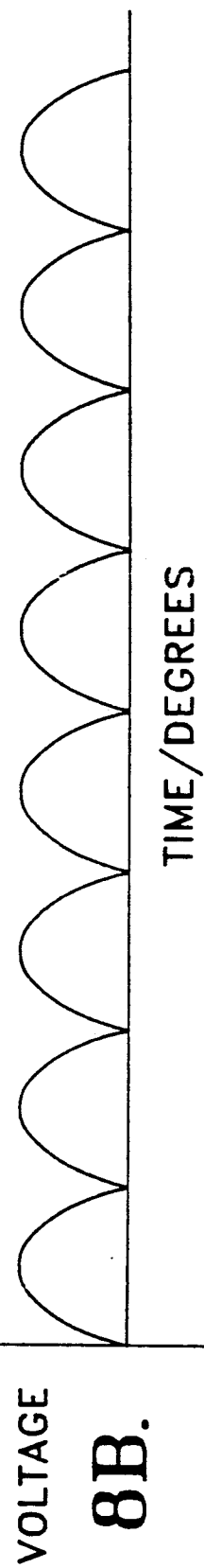
FIG. 8B is a graph illustrating the voltage input to the output inductor of FIG. 2 when the converter is operated at light loads in the discontinuous output mode.
Figure 8C:
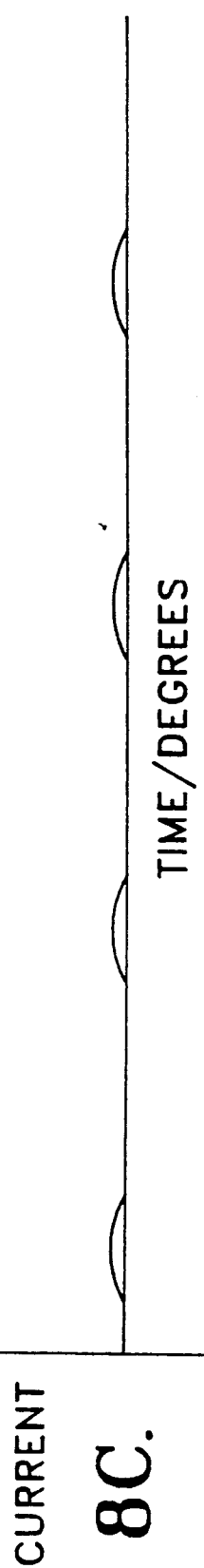
FIG. 8C is a graph illustrating the current flow through diode D1 in FIG. 2 when the converter is operated at light loads in the discontinuous output mode.
Figure 8D:
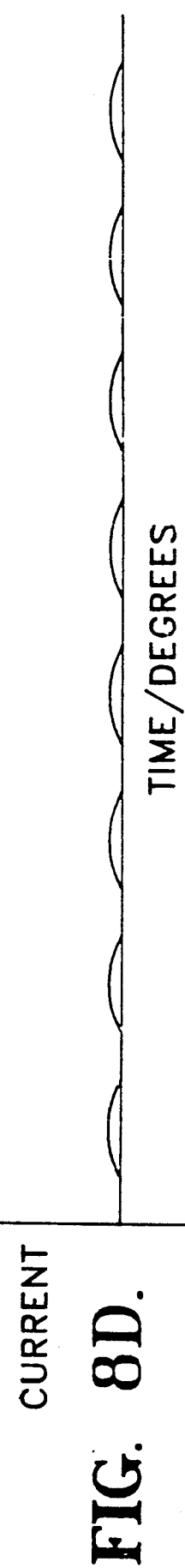
FIG. 8D is a graph illustrating the current output by the output inductor in FIG. 2 when the converter is operated at light loads in the discontinuous output mode.

The converter according to the present invention may be operated in a discontinuous output mode for lighter loads. Waveforms corresponding to this discontinuous mode of operation are shown in FIGS. 8A–8D. FIG. 8A illustrates the tank voltage waveform. In the discontinuous mode, the output voltage is greater than the average inductor input voltage. At near-zero load conditions, the output voltage approaches the peak of the inductor input voltage. Therefore, the tank voltage in FIG. 8A is lower than the tank voltage for the continuous mode depicted in 7A to maintain the same regulated output voltage. FIG. 8C depicts the current through diode D1; the current through diode D2 has an identical waveform but is 180° out of phase. The current in inductor LO1 is shown in FIG. 8D.

An important feature of the invention will be described by reference to FIGS. 7B and 7C. FIG. 7B depicts the voltage input to inductor LO1. When the input voltage to this inductor is zero, the voltage across both diodes in the full-wave rectifier is essentially zero. FIG. 7C illustrates the current in one of the rectified diodes; the current in the other diode has the same waveform but is 180° out of phase. When one diode commutates, the other starts to conduct a current equal to the commutated current of the commutating diode. The vertical portions of the current waveform in FIG. 7C depict this commutation. The graphs of FIGS. 7B and 7C are in phase relationship with one another. These figures indicate that the commutation of current in the rectifiers occurs when there is essentially zero voltage across both of the diodes. This condition is the optimum commutating condition for diodes, an results in very low stress on the diodes as well as a reduction in the tendency for ringing and for the generation of electromagnetic interference.

To this point, the operation of the converter has been discussed in two parts; the operation of switch S1 and the primary circuit was first discussed, then the operation of the output circuit was discussed. A description of the normal operation of the entire converter will now be given.

In normal operation, a load is present at the output terminals of the converter. The regulated voltage present at the output terminals causes a current to flow in the load. The current flowing in the load is provided through the output inductor LO1, and originates in rectifiers D1 and D2. This process removes energy from the tank. Since the switching action of the primary circuit adds energy to the tank, the steady-state operation of the converter requires that an equilibrium condition be established in the circuit, where the amount of energy added to the tank by the primary circuit equals the amount of energy removed from the tank by the full wave rectifying output circuit. It is a function of the control circuit U1 to enable switch S1 to open and close at the correct times to maintain this equilibrium. For transient conditions such as load increases or decreases, the control circuit U1 must respond by changing the timing of the opening and closing of the switch to add more or less energy to the tank as required to maintain the equilibrium condition. Control circuit U1 should also control the peak tank voltage during these transient conditions since a temporary increase in tank voltage is necessary to increase the current in output inductor LO1 for transient load increases, and conversely a temporary decrease in the tank voltage causes a decrease in the output inductor current for transient load reduction.

In all of the above descriptions of the invention's operation, it has been assumed that the inductance of primary inductor LP1 is much larger than the inductance of resonant inductor LR1. This was convenient to minimize the effects of inductor LP1 on resonant circuit LR1-CR1. The closing of switch S1 effectively places primary inductor LP1 in parallel with resonant inductor LR1, thus increasing the resonant frequency. The waveforms of FIGS. 4A–4C depict a steady frequency since the assumption that primary inductor LP1 is much larger than resonant inductor LR1 makes any frequency change very small.

Figure 4D:
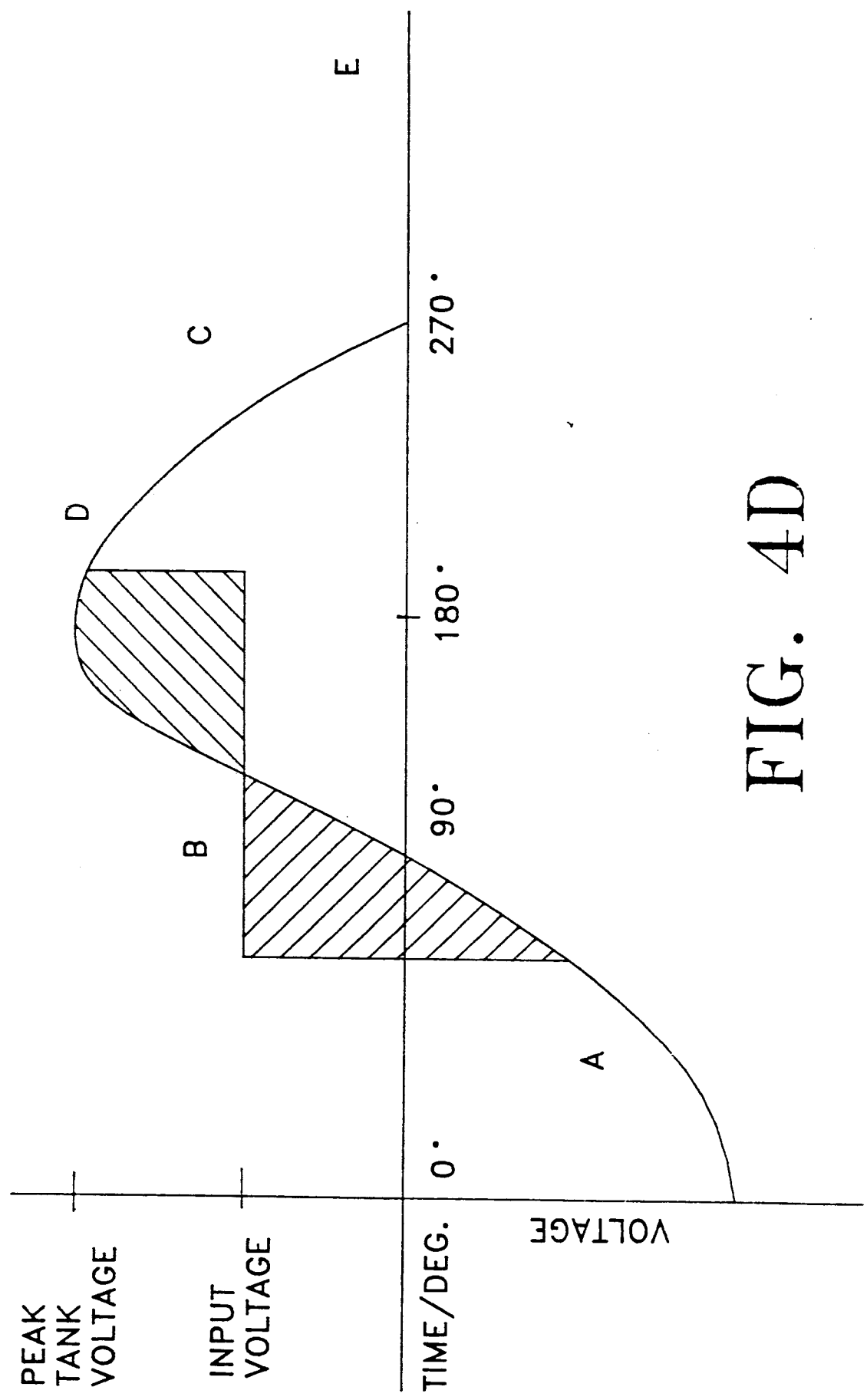
FIG. 4D is a graph illustrating the tank voltage of the first embodiment depicted in FIG. 2 when the primary inductor is similar in size to the tank inductor.

For most practical embodiments of the invention, primary inductor LP1 is not large when compared to resonant inductor LR1, and may even be smaller than inductor LR1. In these instances, the placement of primary inductor LP1 in parallel with resonant inductor LR1 when switch S1 closes causes a significant decrease in the period of the tank output voltage waveform for the length of time that switch S1 is closed. This decrease in the period is illustrated by the waveform depicted in FIG. 4D, wherein the period of oscillation is shorter between the points where the switch closes at point A, and where the switch opens at point D than in a typical sinusoidal curve unaffected by the inductances. The fact that point E is the point where the waveform would have crossed zero if the switch had not been closed during this cycle further illustrates the effect of the switch's closing. The closing of the switch results in a significant increase in tank frequency due to the parallel effect of the primary inductor LP1. This frequency change indicates that the operating frequency of the converter is load dependent. The operating frequency increases with increasing load since the increasing load causes primary inductor LP1 to be switched in parallel with resonant inductor LR1 for a longer portion of the tank period. When the converter is unloaded it operates at its lowest frequency, the natural resonant frequency of inductor LR1 and capacitor CR1. The transfer function of the converter is believed to be essentially linear with respect to operating frequency. This permits the use of the many known frequency modulation techniques to control the converter. The control circuit U1 must accommodate this frequency change to regulate the necessary operating conditions.

The size of inductor LO1 partially controls the amount of current flowing in the primary circuit for any given set of converter operating conditions. For a given input voltage, the amount of current flow is a measure of the amount of energy released. Therefore, in a given converter with a fixed input voltage VI and a fixed tank peak voltage, the maximum amount of energy that may be transferred depends upon the maximum current that may flow out of the voltage source VI. This maximum amount of current is dependent upon the value of inductor LP1. Smaller primary inductances allow greater current flow and greater power transfer.

The embodiments of the converter described thus far have used a single switch for transferring energy into the tank; such configurations are called "single-ended" designs. The single switch switches once for every cycle of the tank. However, the output is the full wave rectified tank voltage. Two positive voltage half waves are applied to the output inductor for every switch cycle. In other words, the output inductor operates at effectively twice the switching frequency of the primary circuit. This characteristic allows a small and inexpensive inductor to be used for the output inductor, resulting in significantly reduced AC switching frequency ripple on the output voltage.

The operation of the output inductor at twice the primary switching frequency means that energy is removed from the tank on both tank half cycles. However, energy is added to the tank on only one of the half cycles of the output inductor. When energy is switched into the tank, it assists the tank in providing output energy. However, the tank does not receive any such assistance on the other half cycle. The result of this imbalance is that the tank operates asymmetrically with respect to half cycle peak voltages; the peak is highest for the half cycle where energy is added to the tank. The resonating capacitor and resonating inductor must be chosen with this condition in mind. They must be chosen so that sufficient energy is stored to support the converter's design point maximum load without depleting the tank below the point where the tank cannot maintain sustained oscillation. A typical design point for ensuring that sufficient energy is stored to support continued oscillation is given by the following equation:

$$\tfrac{1}{2}CV^2 = 2L$$

where C equals the capacitance of the resonating capacitor; V equals the peak tank voltage; and L equals the amount of energy, in joules, required to support the maximum load for the tank half cycle during which switch energy is not added.

The use of this design point assures that the tank peak voltage for the half cycle during which energy is not added will not decrease to less than 0.707 of the tank peak voltage for the half cycle during which energy is added.

Figure 9A:
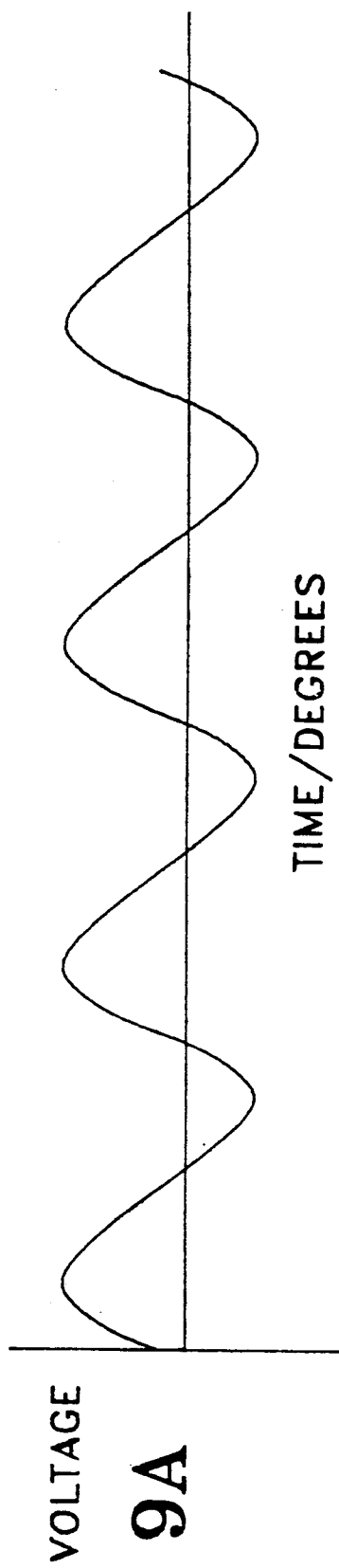
FIG. 9A is a graph illustrating the tank voltage of the converter in FIG. 2 when it is operated under full load conditions.
Figure 9B:
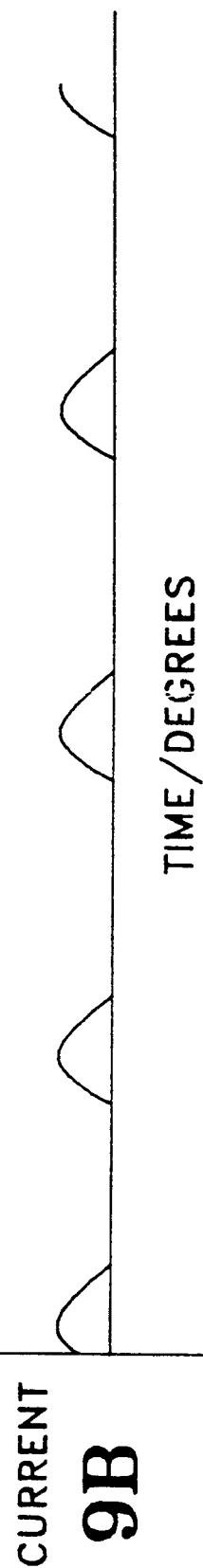
FIG. 9B is a graph illustrating the current through the primary inductor in FIG. 2 under full load conditions.
Figure 9C:
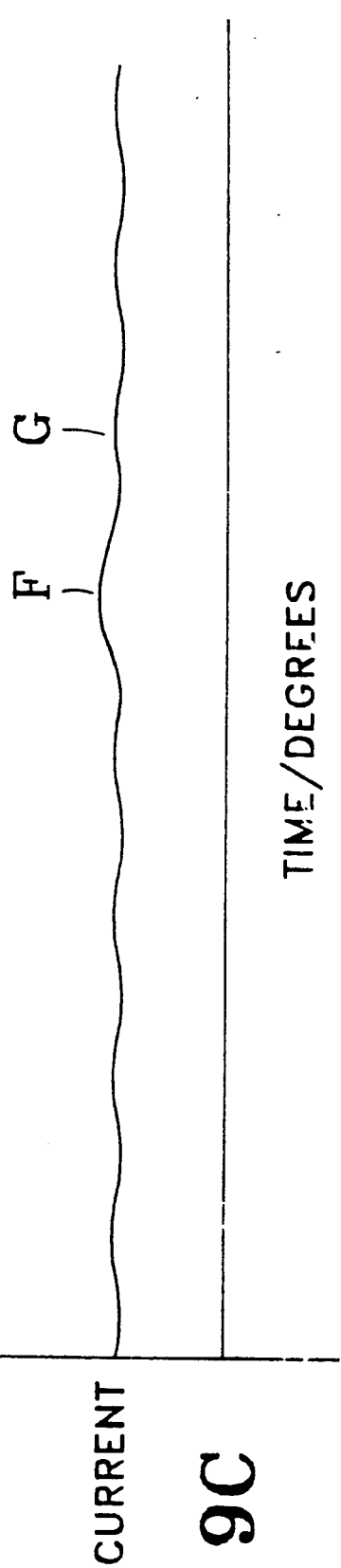
FIG. 9C is a graph illustrating the current output by the output inductor in FIG. 2 under full load conditions.

FIGS. 9A-9C are graphs relating to the operation of the first embodiment of FIG. 2 under full load conditions. FIG. 9A illustrates the tank voltage waveform under such conditions. In FIG. 9A the positive-going peaks are higher than the negative-going peaks since energy is added to the tank on the positive half cycle. Also, the positive-going portion of the wave has a much steeper slope, since the tank resonant period is shortened due to primary inductor LP1 being switched into the circuit. FIG. 9B depicts the primary current waveform FIG. 9C illustrates the current in output inductor LO1. The ripple peaks for the positive half wave shown at point F are slightly higher than the ripple peaks for the negative half wave, shown at point G. This is due to the asymmetry in the tank voltage peak.

Up to this point, only the operation of a single-ended embodiment of the invention has been described. However, the present invention includes double-ended embodiments having two switches operated out of phase. Double-ended configurations have the advantages of providing symmetrical tank voltage regardless of the load, and a reduction of stress on the circuit components due to the sharing of the primary current between the two switches.

Figure 10:
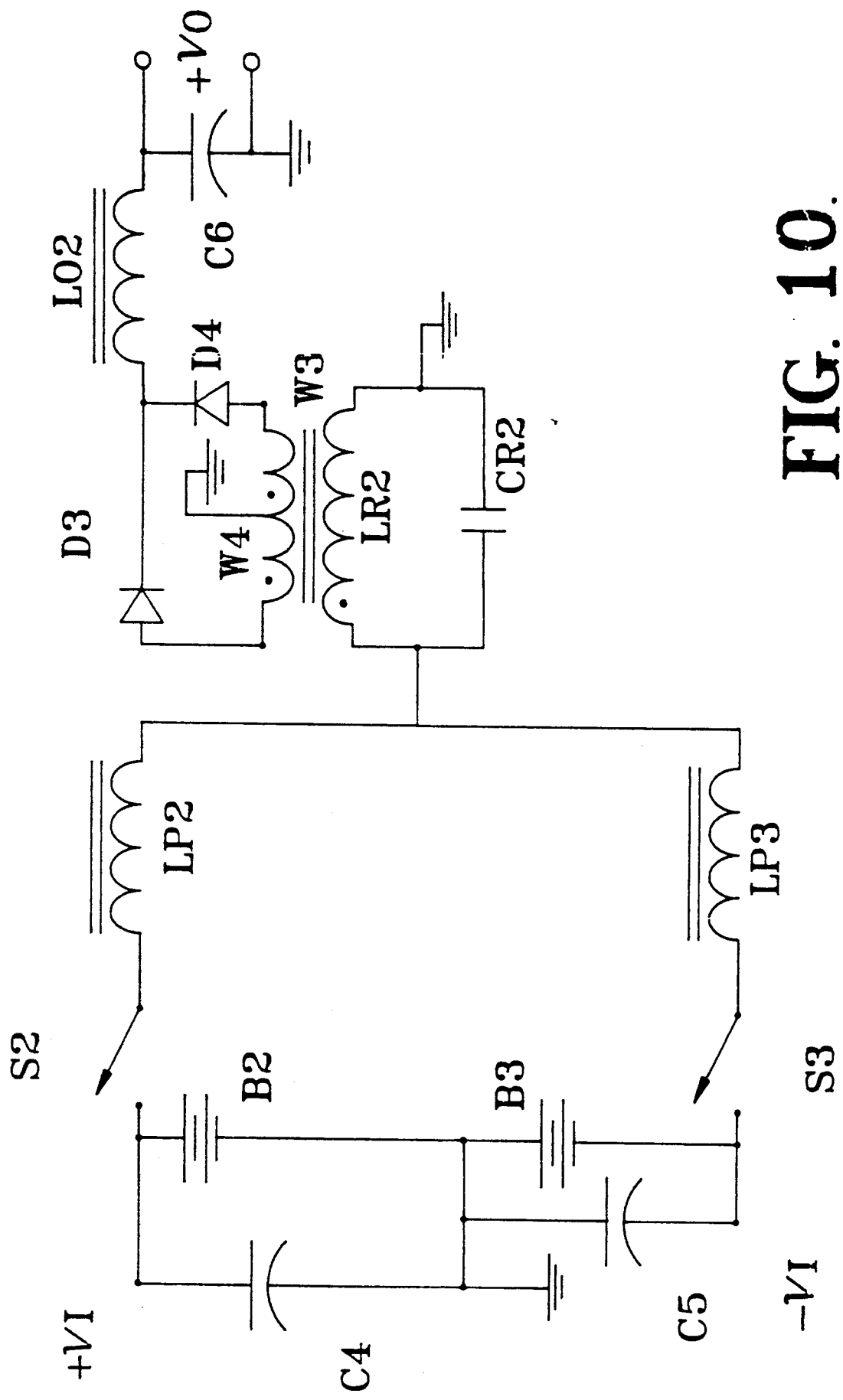
FIG. 10 is a schematic diagram of a double-ended second embodiments having two switches that alternately switch positive and negative DC voltage to provide energy to the tank circuit.

FIG. 10 is a schematic diagram of the present invention where two switches, alternately switching positive and negative sources of DC voltage, provide energy to the tank. The circuit of FIG. 10 is similar to the circuit of FIG. 2, with the addition of a source of negative DC voltage battery B3, filter capacitor C5, switch S3, and primary inductor LP3. The voltage of battery B3 is of the same magnitude but opposite in polarity to the voltage of battery B2. The inductance of primary inductor LP3 is the same as that of primary inductor LP2. Switch S2 is closed on the positive-going part of the tank voltage waveform and functions like switch S1 in the single-ended version of the converter discussed above. Switch S3 is closed on the negative-going part of the tank voltage waveform, 180° out of phase from the closure of switch S2. The closing of switch S3 adds energy from battery B3 to the tank on the negative half cycle to supplement the energy added to the tank by switch S2 on the positive half cycle. The operation of switch S3, and its related current waveforms and energy transfer characteristics, are identical to those described above for the operation of switch S1 in FIG. 2, except that the polarity of the voltage and current are opposite, and that switch S3 acts on the opposite tank half cycle from switch S2. Switches S2 and S3 will transfer exactly the same amount of energy to the tank if they are operated 180° out of phase under the conditions described above. No change in the output circuit of FIG. 2 is required for the double-ended version of the converter depicted in FIG. 10.

Figure 11:
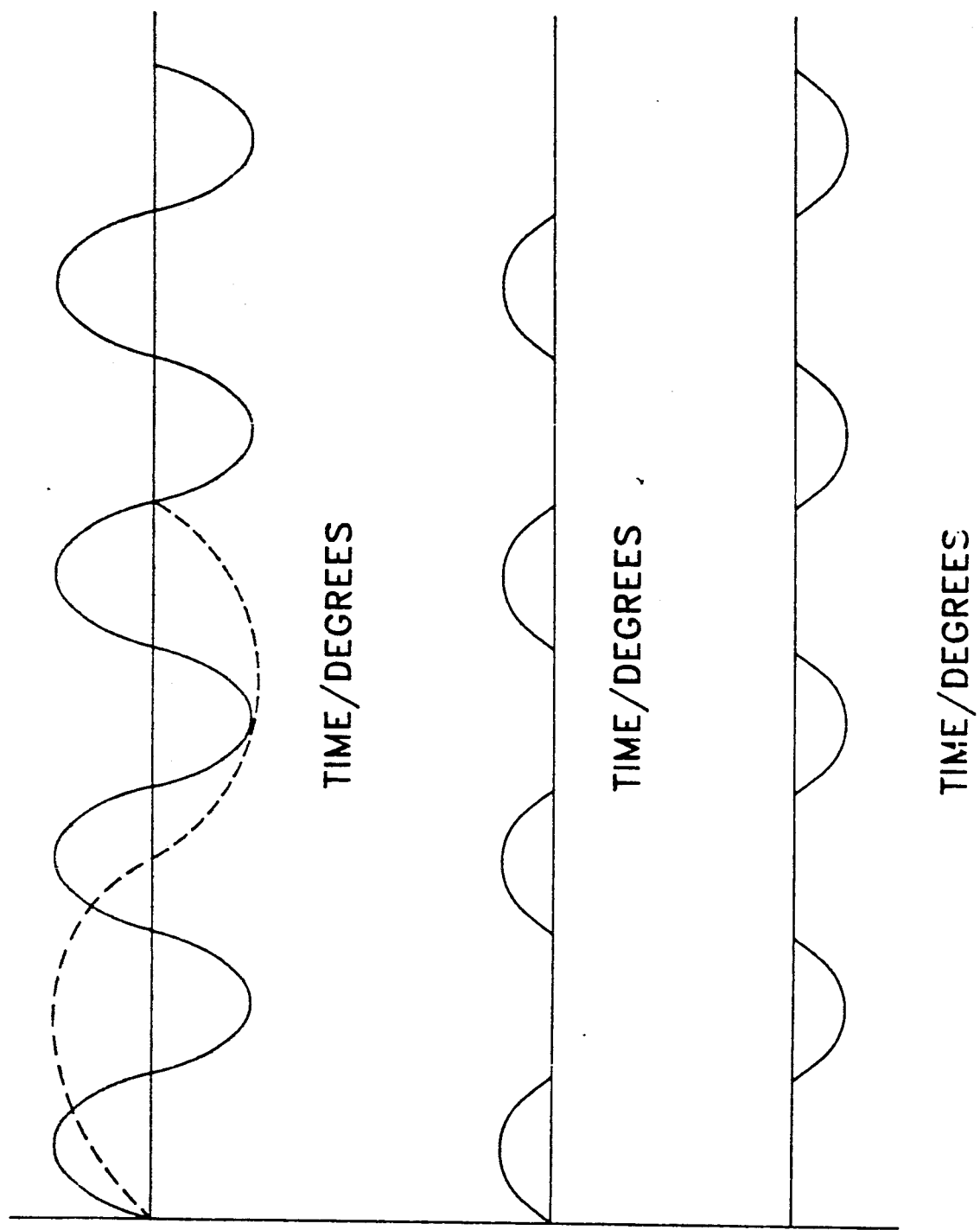
FIG. 11A is a graph illustrating the tank voltage for the second embodiment depicted in FIG. 10.
FIG. 11B is a graph illustrating the current flow through the primary inductor LP2 of the converter in FIG. 10.
FIG. 11C is a graph illustrating the current flow through the primary inductor LP3 of the converter in FIG. 10.

FIGS. 11A-11C are graphs illustrating waveforms for the double-ended configuration of FIG. 10. The solid curve in FIG. 11A represents the tank voltage waveform for maximum load conditions. This tank voltage waveform is essentially symmetrical since equal amounts of energy are added on both half cycles, and since equal primary inductances are switched for equal amounts of time. The dashed, partial curve in FIG. 11A illustrates the tank voltage waveform for no-load converter operation. The increase in tank frequency is apparent by comparing the solid and dashed curves in FIG. 11A. FIG. 11B illustrates the waveform of the current in the primary inductor LP2. FIG. 11C illustrates the waveform of the current in the primary inductor LP3. The current waveforms of FIGS. 11B and 11C are of equal magnitude but of opposite polarity and 180° out of phase.

Figure 12:
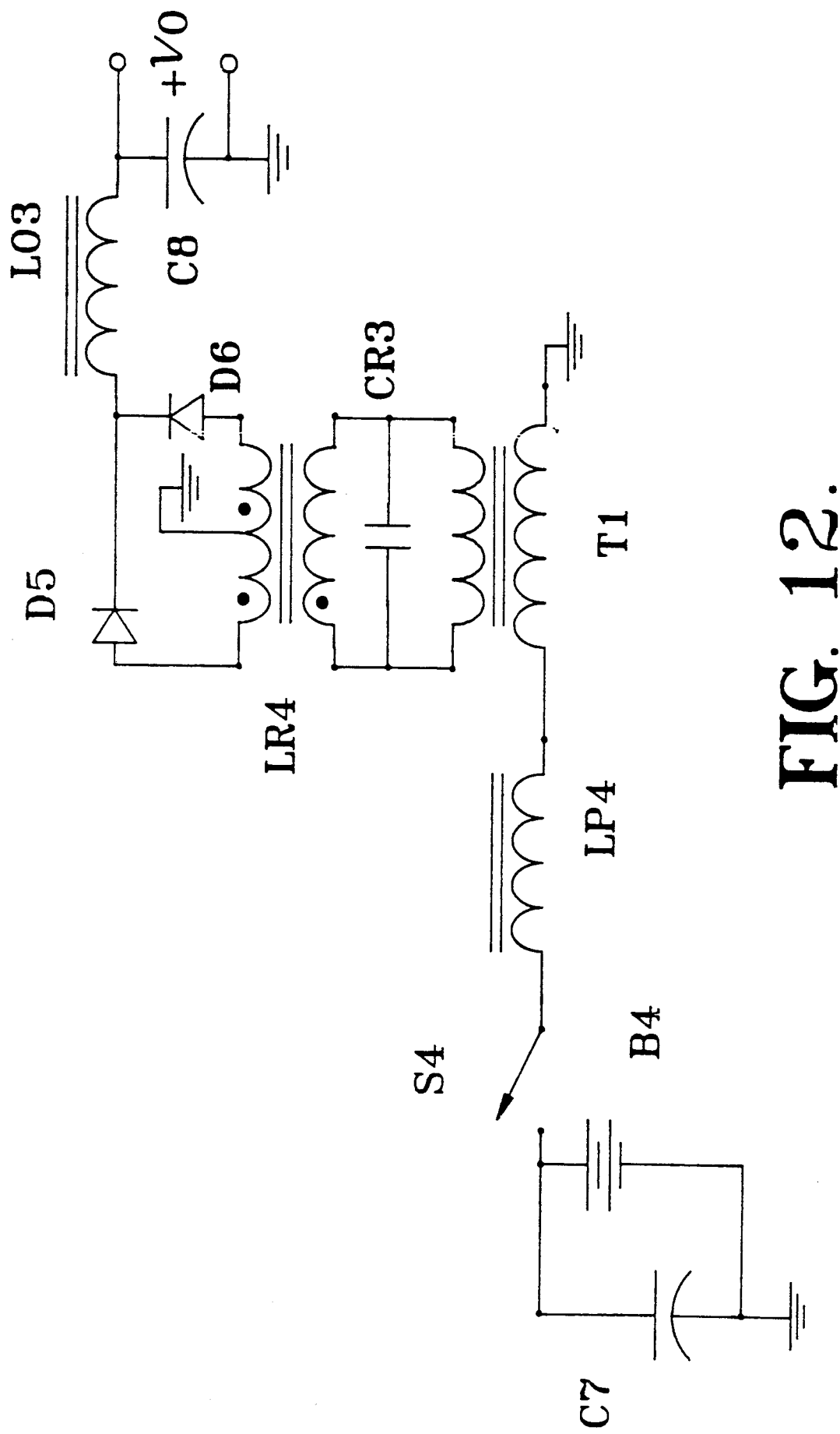
FIG. 12 is a schematic diagram of a third embodiment in which transformer T1 is coupled with the tank circuit.

Transformer coupling techniques may be advantageously used in the converter according to the present invention. FIG. 12 illustrates a third embodiment wherein the primary circuit is transformer-coupled to the tank by isolation transformer T1 by the series connection of transformer T1 with primary inductor LP4. This transformer coupling permits input to output voltage isolation. Transformer T1 has a primary transformer winding and a secondary transformer winding magnetically coupled with its primary transformer winding. The secondary transformer winding is connected in circuit with the primary inductive winding of resonant inductor LR4.

One disadvantage of the circuit depicted in FIG. 12 is that the unequal half cycle voltage peaks of the resonating inductor LR4 at large load conditions may cause a volt-second imbalance across transformer T1. This may cause transformer T1 to saturate. To overcome this problem, transformer T1 may be arranged with a step-gap or some other means may be used to greatly increase the magnetizing current with increasing flux density, so that the magnetizing current of transformer T1 would assist in balancing the voltage peaks of the tank circuit.

Figure 13:
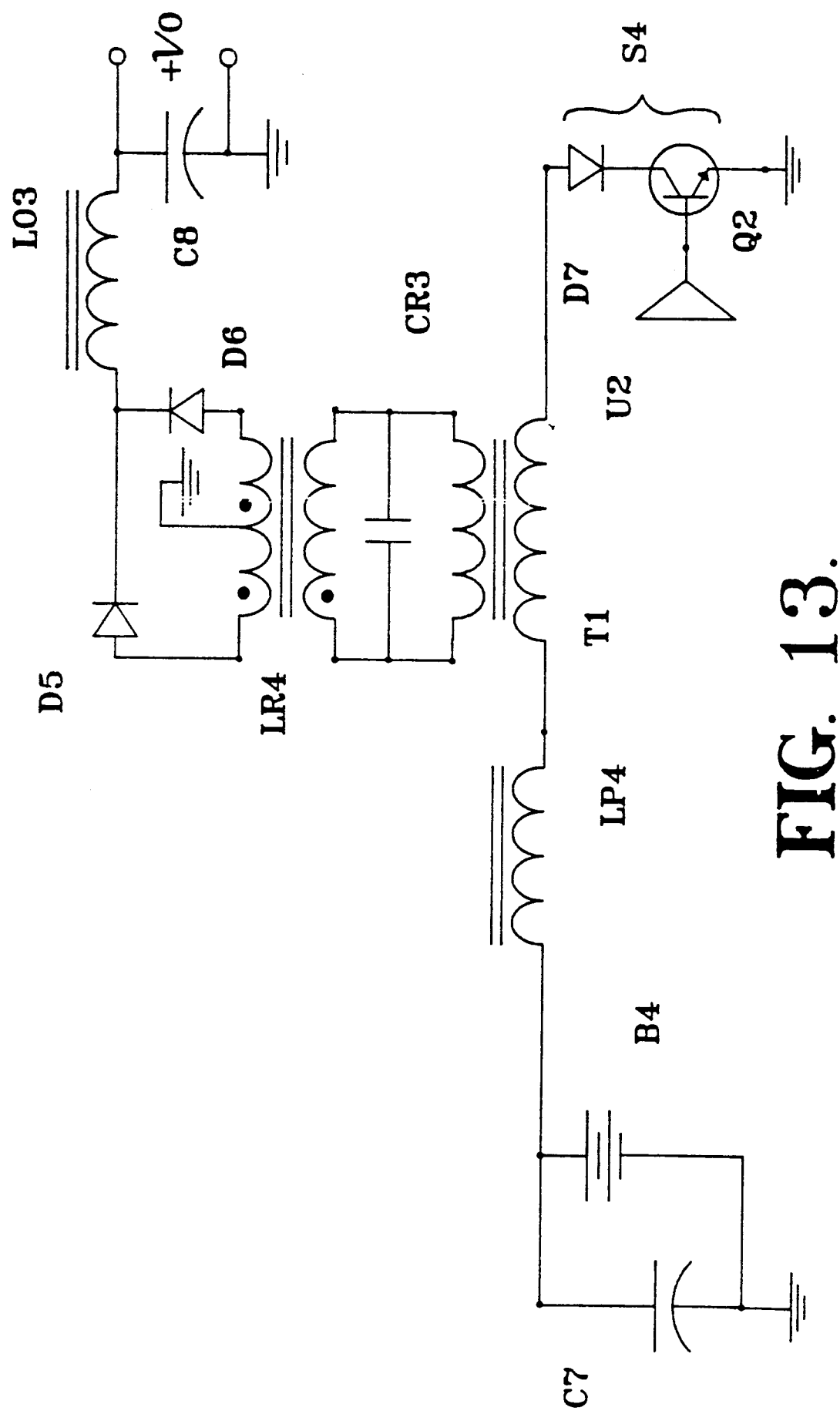
FIG. 13 is a schematic diagram of the third embodiment depicted in FIG. 12 except that the location of switch S4 has been changed.

FIG. 13 is a schematic diagram of the same third embodiment depicted in FIG. 12 except that the location of switch S4 has been changed. Switch S4 is a unidirectional switch comprised of a switching transistor Q2 connected in series with a rectifying diode D7. In either FIG. 12 or 13, the tank voltage no longer acts directly on the primary inductor LP4, but rather acts indirectly through the turns ratio of transformer T1. The tank voltage induced on the primary winding of transformer T1 cooperates with the input voltage VI to provide the voltage difference to generate and control the sinusoidal flow of current in primary inductor LP4. This transformer-coupled configuration does not change the operating principles of the invention as discussed above in connection with FIGS. 2 and 3.

Figure 14:
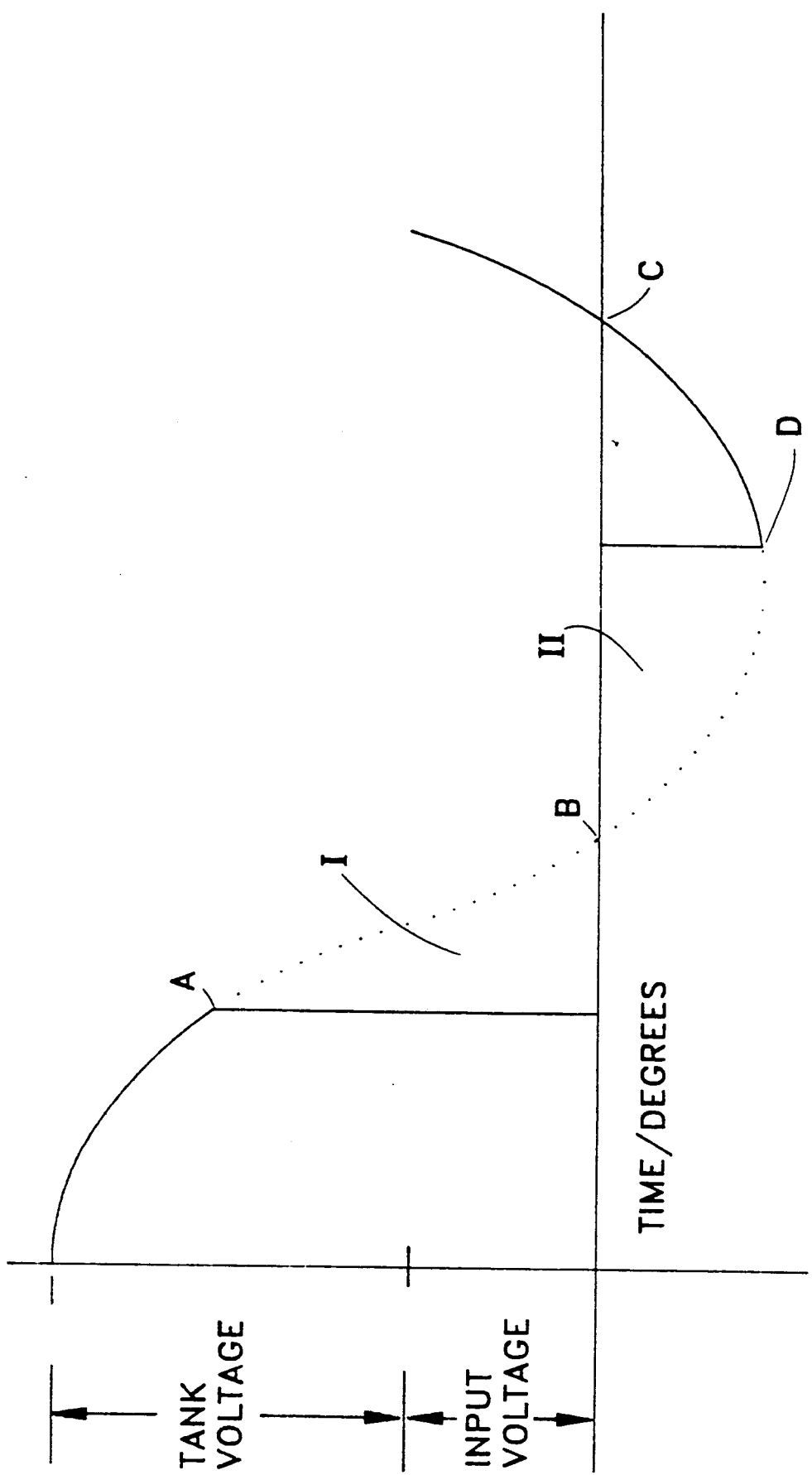
FIG. 14 is a graph illustrating the voltage across the switch in FIG. 13.

FIG. 14 illustrates the voltage measured across switch S4, from the anode of the diode to common for one switch cycle of the primary circuit of FIG. 13. In FIG. 14 the maximum voltage across switch S4 is the sum of the input voltage VI and the peak tank voltage reflected across the turns ratio of transformer T1.

Switch S4 is closed at point A, and current in the primary circuit begins to increase sinusoidally. The sum of the reflected tank voltage and VI is zero at point B, so that the primary current has reached its maximum. The current decreases to zero at point D. The dashed line indicates that the primary voltage is the sum of VI and the reflected tank voltage. When switch S4 closes, it is the difference between this sum and common that is the voltage across primary inductor LP4. The region I is the volt-seconds product across primary inductor LP4 that causes an increase in current; region II is the equal volt-seconds product that causes the current to decrease to zero.

Another advantage of the transformer-coupled configuration may be seen from FIG. 13. In FIG. 13, the switching elements comprising switch S4 include a diode D7 and a transistor Q2 connected in series. These switching elements may be located anywhere in the primary circuit, including the common side of transformer T1. Where a transistor-diode pair is used for switch S4, the transistor may be referenced to circuit common. This has the advantage of facilitating the driving and controlling of the transistor.

Figure 15E:
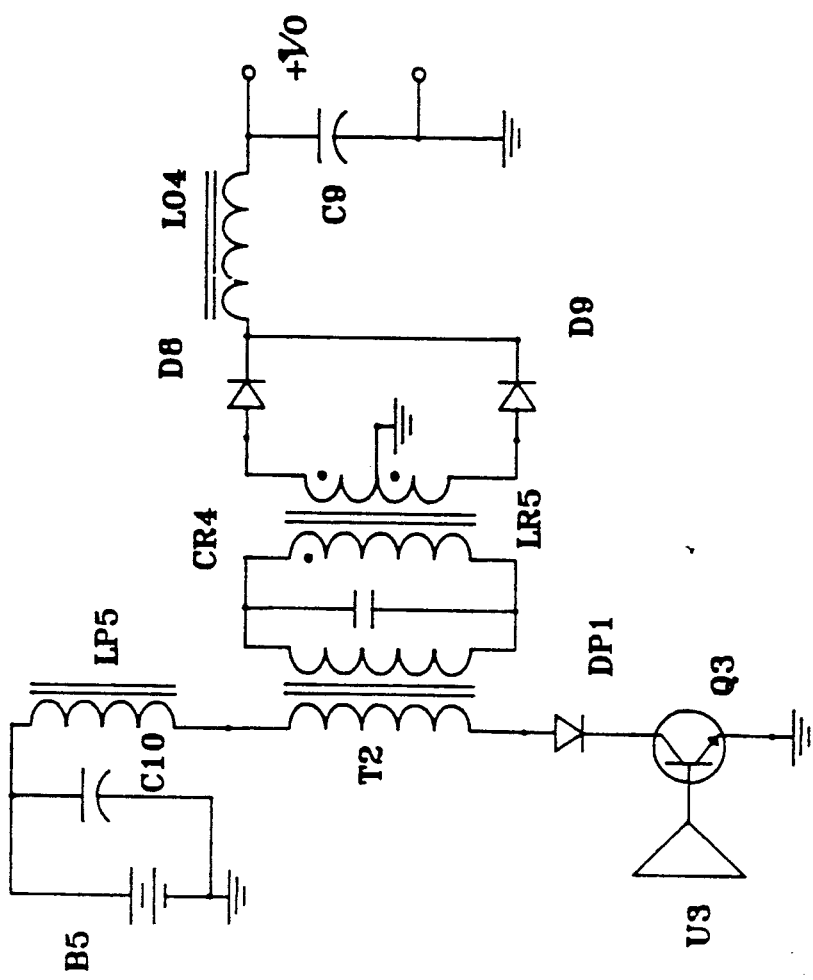
FIG. 15E is a schematic diagram of a fourth embodiment, depicting the circuit of FIG. 15D with the addition of a battery, another filter capacitor, and a switch.

FIGS. 15A-15E illustrate the building or development of the converter around a real transformer T2. FIG. 15A is a well-known prior art model of a real transformer, where an ideal transformer T2 is connected in parallel with its magnetizing inductance LM1. The leakage inductance LL1 is connected in series with the parallel combination of the ideal transformer T2 and its magnetizing inductance LM1.

FIG. 15B illustrates the well-known principle of transformers that any component coupled across the transformer primary winding may be reflected to the secondary winding of the transformer, and vice versa. In FIG. 15B, the magnetizing inductance LM1 has been moved to the secondary side of transformer T2.

FIG. 15C is the same circuit as FIG. 15B except that a resonating capacitor CR4 has been placed in parallel with the magnetizing inductance LM1 of transformer T2 to form an LC resonant circuit. A center-tapped winding has been added to the magnetizing inductance LM1. Rectifying diodes D8 and D9 function as a full-wave rectifier.

Figure 15D:
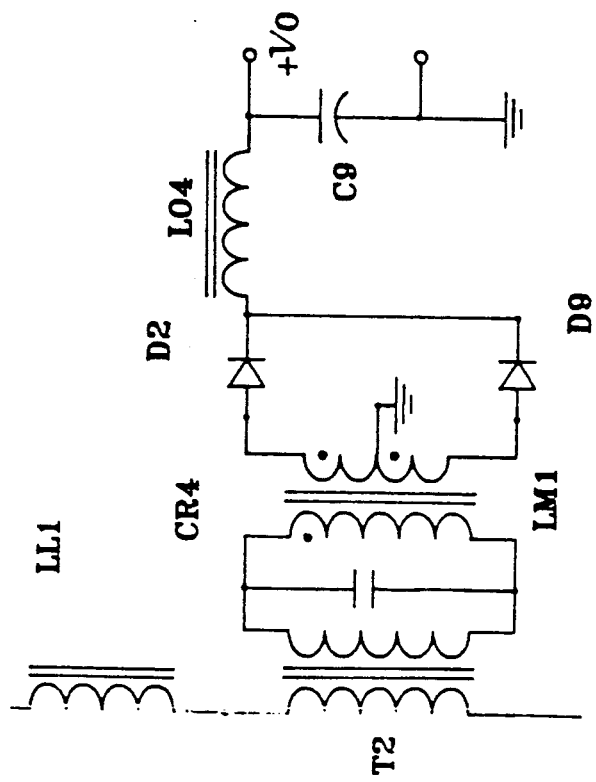
FIG. 15D is a schematic diagram depicting the circuit of FIG. 15C, with the addition of an output inductor, a filter capacitor, and output terminals.

FIG. 15D is similar to the circuit of FIG. 15C, except that an output inductor LO4, a filter capacitor C9, and output terminals for VO have been added.

FIG. 15E is similar to the circuit of FIG. 15D with the addition of a battery B5, a filter capacitor C10 connected to one side of the primary winding of transformer T2, and a switch, consisting of transistor Q3 and primary diode DP1, connected to the other side of the primary winding. The leakage inductance LL1 has been renamed as primary inductor LP5 but is otherwise unchanged from FIG. 15D. A control circuit U3 has been added for controlling transistor Q3.

The circuit depicted in FIG. 15E is electrically identical to the circuit of FIG. 13. This is significant since all of the magnetic functions of the converter except the output inductance may be realized utilizing only one magnetic element. Primary inductor LP5 in FIG. 15E is actually the leakage inductance of the real transformer, and inductor LR5 is actually the magnetizing inductance of the real transformer T2. This enables the converter to be constructed around a typical transformer, such as a common ferrite E-core. The primary winding, tank inductor winding, and center-tapped full-wave rectifier output winding may all be wound on a bobbin placed on the center leg of the E-core. The magnetizing inductance and the resonating capacitor are selected to provide the desired no-load operating frequency. In the case of a ferrite core, gapping is typically required. The coupling between the primary winding and the tank winding is adjusted to achieve the desired level of leakage inductance. This is typically achieved by winding the primary and tank windings on separate sections of a split bobbin. The center-tapped output winding is wound closely coupled with the tank winding. Close coupling of the output winding to the tank winding is desirable to linearize the transfer function, and to avoid excess energy being stored in the tank when the converter is operating at maximum load. If the coupling between the tank winding and the output winding is not close, a significant amount of leakage current may exist between the tank winding and the output winding. This leakage inductance will tend to shift the phase of the output rectifier current with respect to the output voltage. The effect of this phase shift is that the rectifier current will no longer commutate at zero voltage, thus negating an important feature of the invention.

Figure 16:
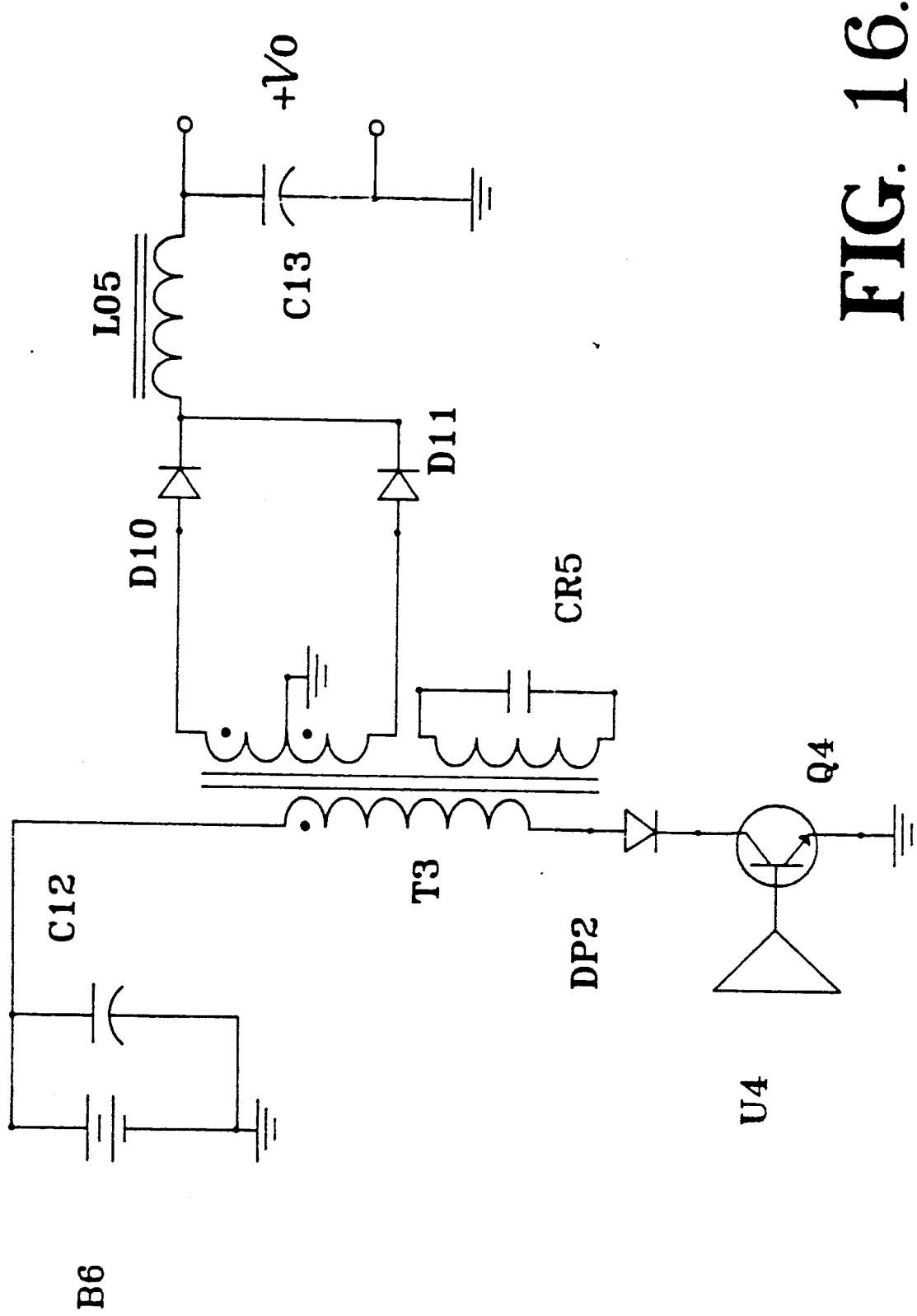
FIG. 16 is a schematic diagram of a fifth embodiment having a single transformer and a single output port.
Figure 21:
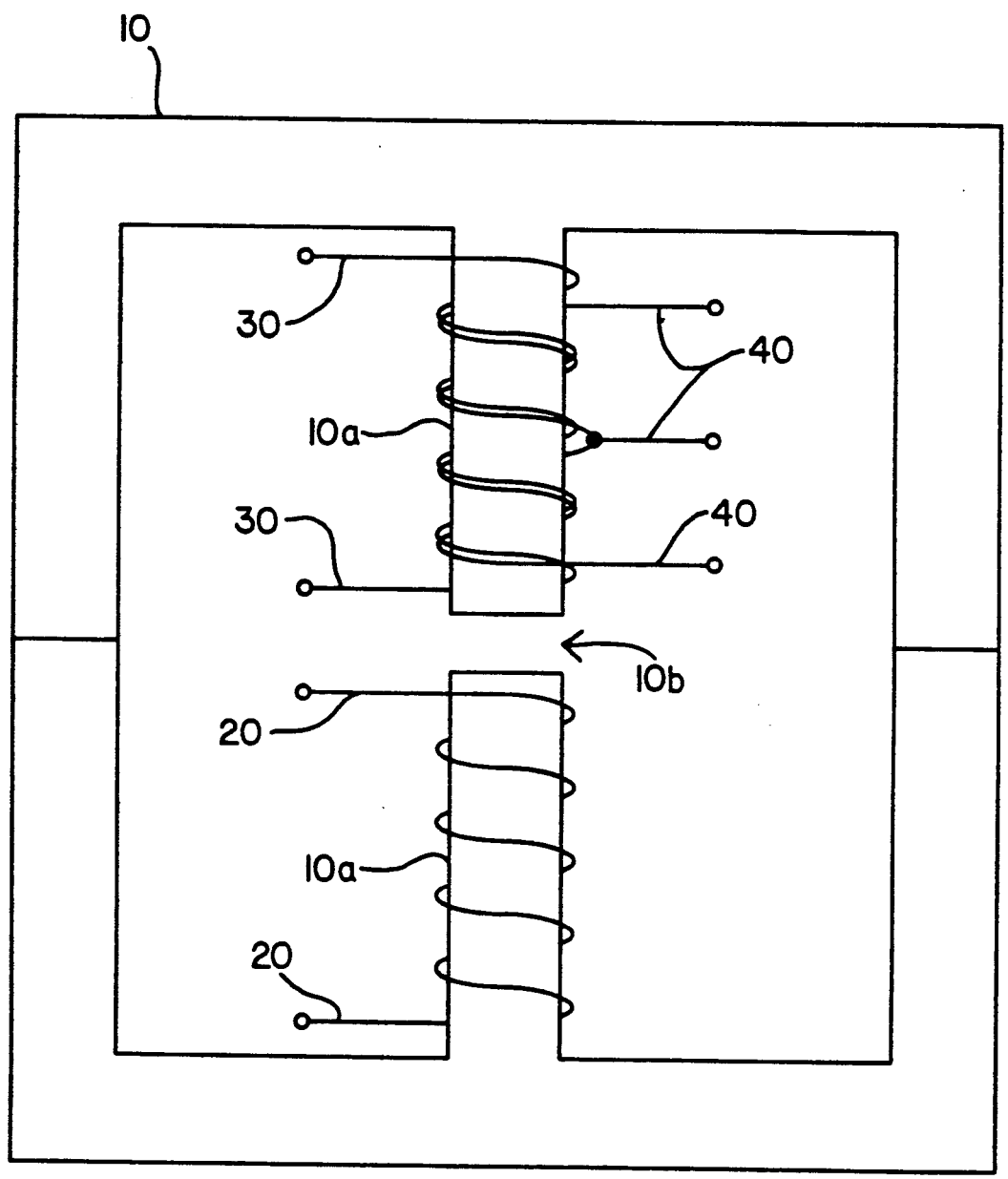
FIG. 21 is a diagram illustrating an embodiment of the invention including a ferrite E-core transformer.
Figure 22:
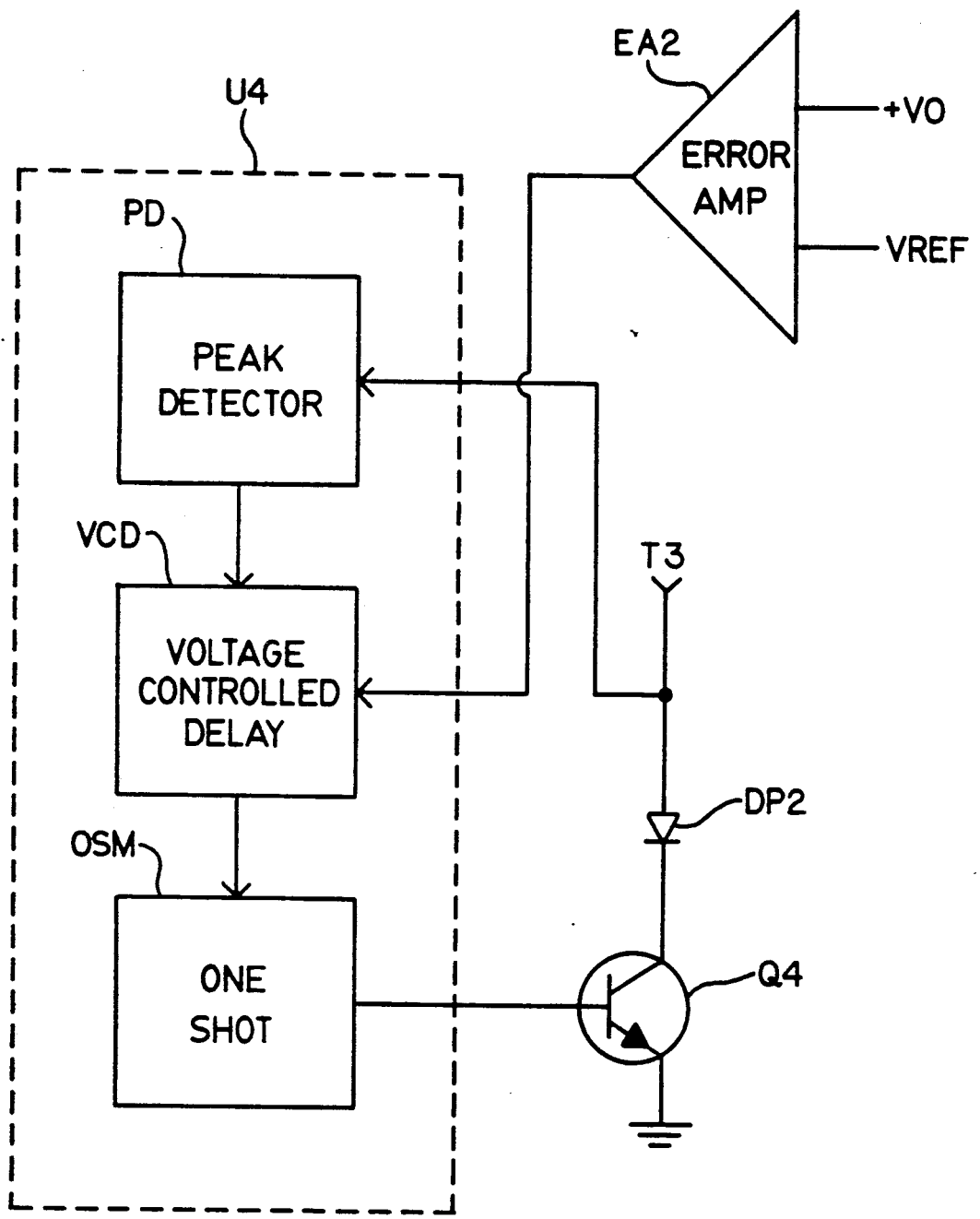
FIG. 22 is a schematic diagram illustrating a phase control circuit of the present invention.

FIG. 22 illustrates the configuration of the transformer T3 of FIG. 16, as it could be advantageously constructed on a readily available E-type core using leakage inductance for the primary inductance. In FIG. 21, a core 10 has a primary winding 20 wound on a center leg 10a thereof, but not occupying the entire width of the leg 10a. The winding 20 is connected in series with the switch. A tank winding 30 is wound on the center leg, but displaced from the winding 20 so as to result in a desired amount of leakage inductance between the two. The tank winding 30 is connected to the resonating capacitor, as shown in FIG. 16. The leg 10a of the core 10 is gapped as shown at 10b, or otherwise adapted to have a value of inductance to achieve the desired resonating frequency in cooperation with the resonating capacitor. A center tapped output winding 40 is wound on and tightly coupled with the tank winding 30, and connected to the appropriate rectifiers as shown in FIG. 16. The windings 20, 30, and 40 are preferably wound on a split bobbin (not shown) as is standard practice in the art when windings are displaced for isolation, and to create substantial leakage inductance. This configuration permits the functions of T3 to be achieved economically with a single magnetic assembly.

FIG. 16 is a schematic diagram of a single-ended, single transformer embodiment of the converter. In FIG. 16, the core of the single transformer T3 is gapped to yield the correct inductance so that it resonates with the resonant capacitor CR5. Transformer T3 should also be chosen so that it stores enough energy to support the output load on the half cycle when the primary circuit is not adding energy to the tank. Resonant capacitor CR5 is connected across the tank winding on the core of transformer T3. The primary winding is also a winding on the core, but is spaced away from the tank winding to permit the desired value of leakage inductance. The output center-tapped winding is wound closely coupled to the tank winding. A separate output inductor LO5 is connected to the cathodes of the full-wave rectifying diodes D10 and D11 to yield a single output.

Figure 17:
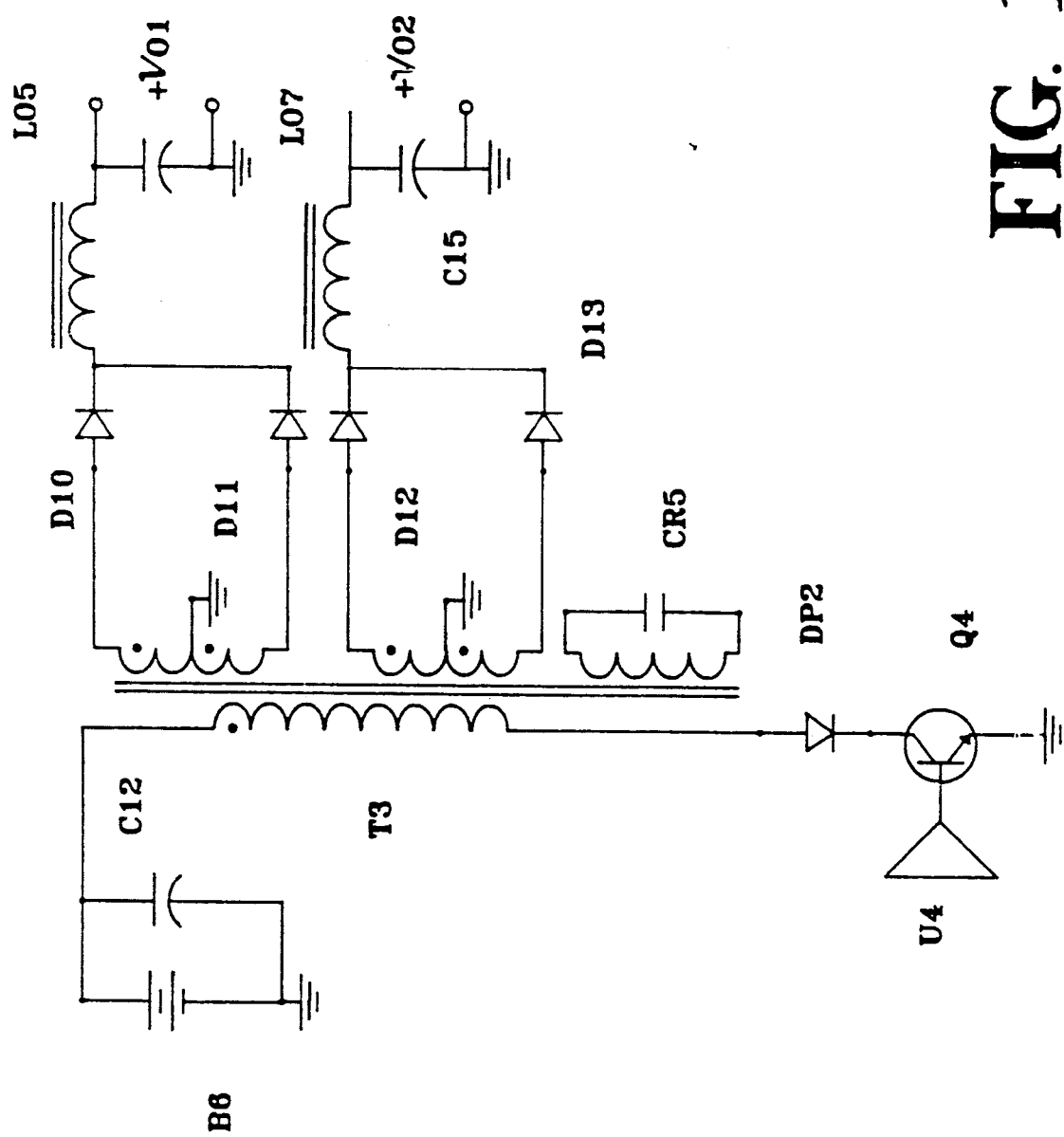
FIG. 17 is a schematic diagram of a sixth embodiment that is similar to the circuit in FIG. 16 except that it has a second output port.

FIG. 17 is a schematic diagram of a single-ended, transformer-coupled, two output embodiment of the present invention. The circuit depicted in FIG. 17 is identical to that depicted in FIG. 16 except for the addition of a second output. The second output consists of a center-tapped output rectifier winding connected to diodes D12 and D13, an output inductor LO7, a smoothing capacitor C15, and a second set of output terminals at which a second voltage LO2 is made available to a load. The second center-tapped output winding functions exactly as the main output winding. That is, the tank voltage induces a proportional voltage on the second output winding; the average of this voltage is the voltage VO2 when output inductor LO7 is in continuous conduction.

Any desired output voltage at any of the output terminals may be achieved by selecting the correct turns ratio between the tank and the output winding. Each half of each center-tapped output winding would normally have the same number of turns as the other half. For example, if the output voltage of each half cycle of the tank winding is 100 volts, and a 5 volt output is to be achieved, the ideal turns ratio between the tank winding and each half of the center-tapped output winding would be about 20:1. If an additional output of 25 volts was required from the same converter, then the turns ratio of the additional output winding would be about 4:1 with respect to the tank winding. This principle holds true for any number of auxiliary outputs. The converter is thus theoretically capable of an almost unlimited number of outputs.

Any of the well-known post-regulator methods may be used with the present converter, including saturable reactor or magnetic amplifier post-regulation. For example, if a 24 volt output were required in the above example, a 4:1 turns ratio could be used to yield 25 volts, and then a traditional linear post-regulator could be connected to reduce the voltage to the required 24 volts.

Figure 18:
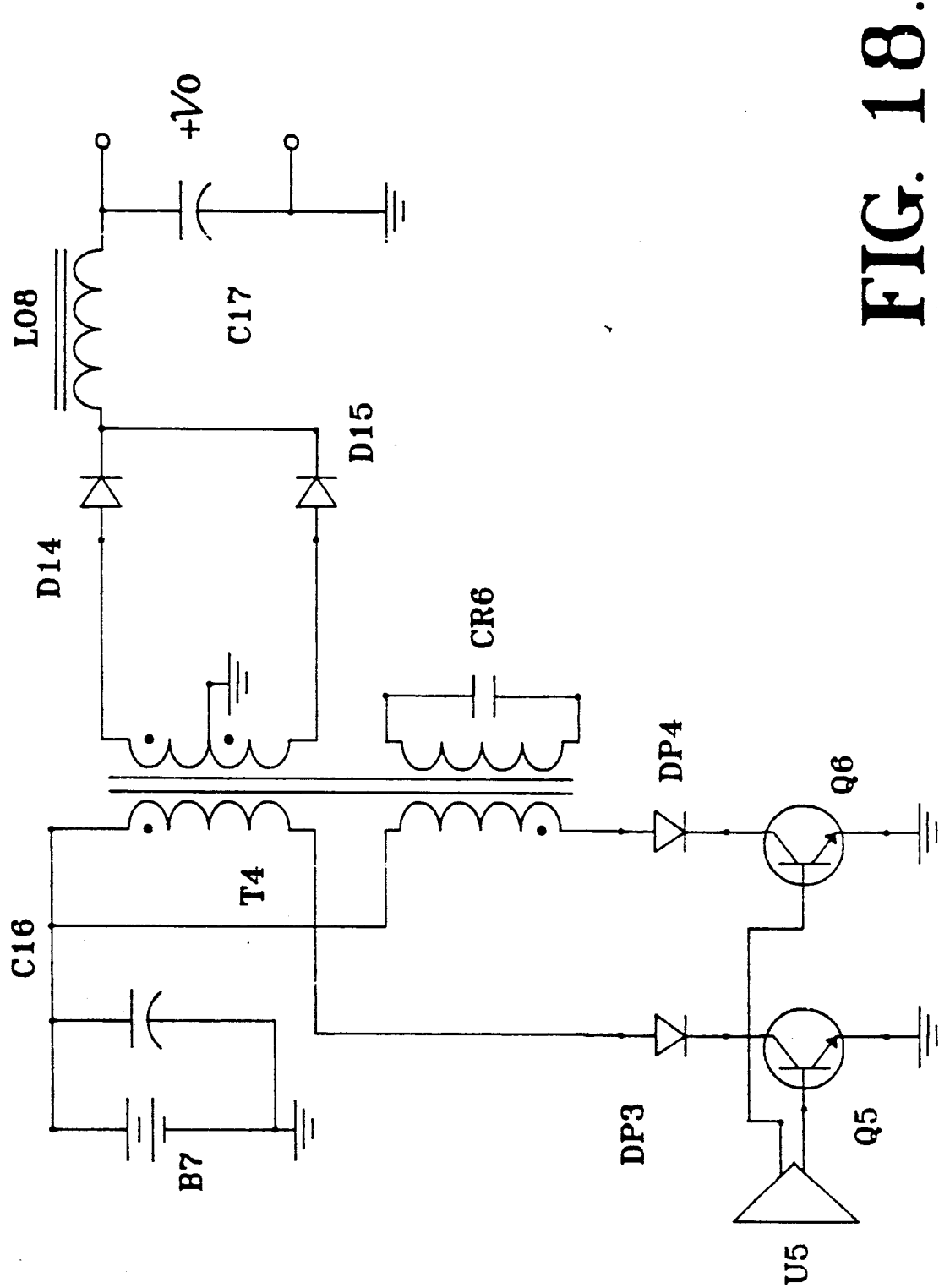
FIG. 18 is a schematic diagram of a seventh embodiment, which is a push-pull, transformer-coupled version of the double-ended embodiment depicted in FIG. 10.

FIG. 18 depicts a schematic diagram of a double-ended, single output transformer-coupled converter according to the present invention. FIG. 18 is a transformer-coupled embodiment of the double-ended converter depicted in FIG. 10. The converter depicted in FIG. 18 operates similar to the converter of FIG. 10, except that the tank now acts on the two primary windings reflected through the turns ratio on transformer T4. This principle of operation was described in detail for the configuration of FIG. 13. A major advantage of this transformer-coupled version of the double-ended converter is that two separate voltage sources of opposite polarity are not required. This transformer-coupled version requires a single polarity source where one of the primary windings of transformers T4 is phased opposite from the other primary winding, and both primary windings are connected to the same voltage source. The embodiment depicted in FIG. 18 uses two switches, both of which are referenced to ground. The converter depicted in FIG. 18 is thus a "push-pull" converter.

Figure 19:
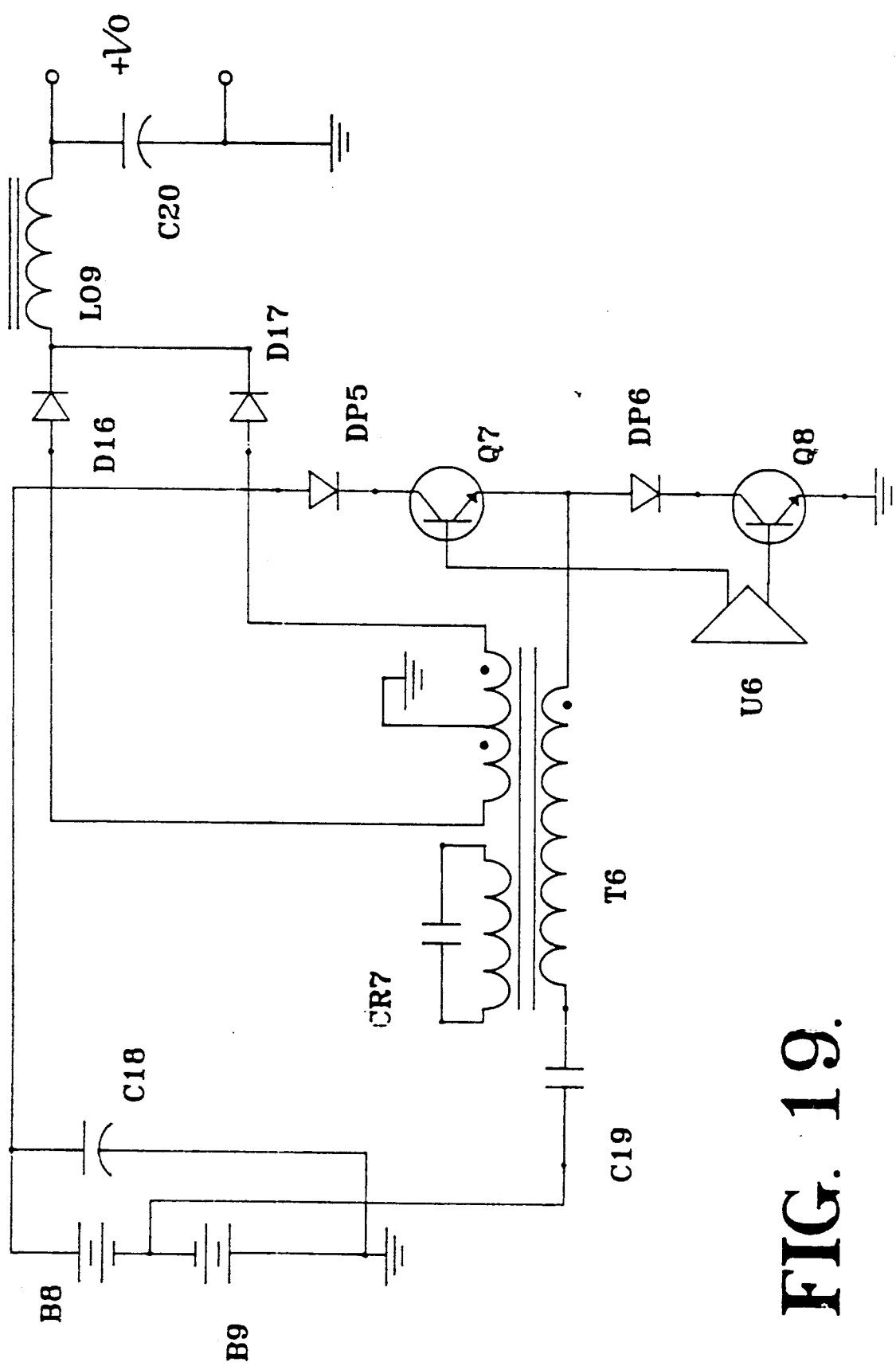
FIG. 19 is a schematic diagram of an eighth embodiment depicting a double-ended, half-bridge converter.

FIG. 19 illustrates a double-ended, half-bridge converter. In this configuration, a single primary winding of transformer T6 is driven from alternately positive and negative voltage sources. These voltage sources are derived from a split DC voltage source consisting of batteries B8 and B9, which are of equal voltage and connected in series. Transistor Q7 connects the primary winding across battery B8, and transistor Q8 connects the primary winding across battery B9. Transistors Q7 and Q8 are operated 180° out of phase. Capacitor C19 acts as a balancing capacitor to maintain the operating point between transistor switches Q7 and Q8 at an average voltage that is essentially half the sum of the voltages of batteries B8 and B9. However, balancing capacitor C19 is not required for the operation of the converter, and may even be omitted for some applications without adversely affecting circuit performance.

Figure 20:
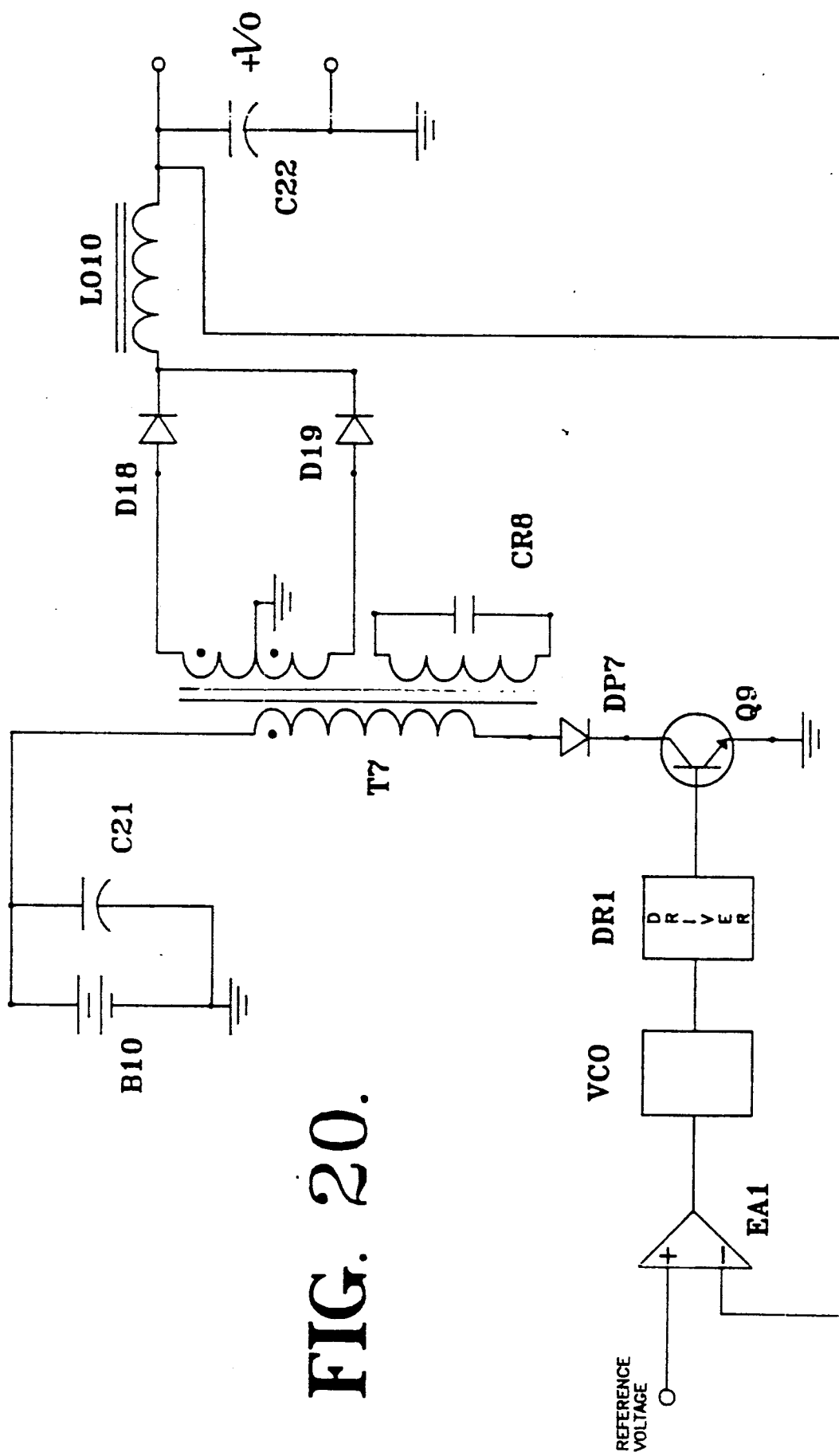
FIG. 20 is a schematic diagram of a ninth embodiment having a regulator to regulate the output voltage.

FIG. 20 illustrates a configuration having a voltage regulator to regulate the output voltage. To achieve voltage regulation, the output voltage is compared to a reference voltage at the input of an error amplifier EA1. This technique is commonly used in the art of switch mode power conversion. Error amplifier EA1 senses any deviation of the output voltage, and generates an output signal proportional to the amount of deviation. The output of error amplifier EA1 is applied to the input of a voltage controlled oscillator VCO to increase the switching frequency if the output voltage is too low, or to decrease the switching frequency if the output voltage is too high. Increasing the switching frequency increases the power transfer of the converter. Voltage controlled oscillator VCO then causes the transistor driver circuit DR1 to turn transistor Q9 on for the appropriate amount of time that allows a sinusoidal pulse of primary current to flow.

The combination of the error amplifier EA1, voltage controlled oscillator VCO, and drive DR1 may be utilized for control of the transistor switch in any of the embodiments of the invention. As discussed above, the primary inductor LP1 is connected in parallel with the resonating inductor LR1 when the switch is closed, and disconnected therefrom when the switch is open. The parallel combination of these two inductors has a lower combined inductance than the resonating inductor LR1 alone. Therefore, the resonant circuit oscillates at a higher frequency when the switch is closed than when the switch is open.

The resonant frequency also varies in accordance with the duty cycle of the converter, or the ratio of the length of time the switch is closed to the total cycle time of the circuit. The higher the duty cycle, or the longer the relative length of time the primary inductor LP1 is connected in parallel with the resonant inductor LR1, the higher the resonant frequency of the circuit. This enables the circuit to operate over a variable frequency range which may be automatically adjusted to match the power requirements of the load.

In response to a decrease in the output voltage +VO which corresponds to an increase in the output load, the amplifier EA1, which constitutes a sensor, produces an output signal corresponding to the difference between the reference voltage VREF and the voltage +VO. This difference signal is applied to the voltage controlled oscillator VCO, causing the frequency of oscillation thereof to increase as the load increases, and vice-versa. The increased oscillator frequency is instantaneously higher than the resonant frequency of the tank circuit, causing the point at which the transistor switch is closed to occur at a relatively earlier time or phase after the negative peak illustrated in FIGS. 4A to 4C. In other words, the phase at which current flow is initiated from the power source to the primary inductor is advanced relative to the previous cycle, resulting in a larger transfer of energy to accommodate the increased load. The converter frequency stabilizes as the tank frequency increases to the oscillator frequency.

The switch is closed at a time after a peak of the tank voltage occurs at a polarity which urges current to flow from the power source or battery through the switch into the primary inductor. At this time, the tank voltage is approaching the supply voltage +V1 (the polarity of which is opposite to that of the positive supply voltage). The switch closure occurs after a delay from the tank voltage peak which decreases as the load increases and the output voltage correspondingly decreases. Exactly the opposite effect occurs in response to a decrease in output load. The switch is opened after a predetermined length of time has elapsed after closure of the switch for the current flow through the primary inductor to decrease to zero in accordance with the equal volt-second principle described with reference to FIGS. 4A to 4D.

The voltage controlled oscillator VCO can be implemented as a conventional constant ON time, variable frequency circuit which responds to a signal from an error amplifier to change the switch operating frequency in response to output voltage errors. Such circuits are well known in the prior art, and respond such that a decrease in regulated voltage would increase the switching frequency. Controls of this type are readily commercially available as integrated circuits, such as the UC3860 from Unitrode, or the MC 34066 from Motorola. In use, the converter is preferably designed with the values of the primary series inductor LP1 and the tank resonating inductor LR1 sized such that the full load operating frequency is about double the no-load operating frequency. The control circuit is then preferably adapted to have minimum and maximum frequencies corresponding to the minimum and maximum converter operating frequencies. The fixed ON time is then set for essentially a 50% duty cycle at the maximum (full load) operating frequency.

At full power, the primary current in the switches naturally declines to zero at about the time the switch is opened by the termination of the control-commanded ON time. At lower powers, the natural decline to zero of the primary current may occur before the termination of the control-commanded ON time. In this case, the blocking diode of the switch prevents reverse current flow through the switch. The fixed control-commanded ON time, in conjunction with the predetermined no-load to full-load frequency range, assures that the switch will be opened by the control before the blocking diode can be forward biased by the next tank half-cycle. In this manner, control of zero current switching, both ON and OFF, can be achieved by a voltage controlled oscillator capable of variable frequency, fixed ON time operation.

FIG. 22 illustrates another method of phase control in accordance with the present invention which is illustrated as being applied to the circuit of FIG. 16. The circuit includes an error amplifier EA2, which produces an error signal proportional to the difference between the output voltage +VO and a reference voltage. The control circuit U4 includes a peak detector PD designed to produce a trigger signal in response to detection of the negative peak of the tank voltage as illustrated in FIGS. 4A to 4D. The trigger signal from the peak detector triggers a voltage controlled delay circuit VCD. The circuit VCD, which may include a variable period, monostable multivibrator, produces an output signal at the end of the delay period, which in turn triggers a one-shot multivibrator OSM. The multivibrator OSM produces a pulse having a fixed period, which turns on the switch transistor Q4 for the duration thereof.

The error signal from the amplifier EA2 is applied to control the delay period of the circuit VCD. In response to an increased load, corresponding to a decreased output voltage +VO, the amplifier EA2 produces the error signal which varies in such a manner as to cause the period of the delay circuit VCD to decrease as the output signal +VO decreases. This advances the phase of the initiation of the switch opening, thereby increasing the duty cycle of the switch and increasing the energy transfer to match the increased load.

The peak detector may be embodied in a number of forms, but typically includes a differentiator (not shown) which actuates a comparator to produce the trigger signal in the form of a pulse at the differentiator zero crossings to indicate a voltage peak. This pulse is gated to block any pulse corresponding to the positive voltage peak, and only produce the trigger signal in response to the negative peaks. The delay circuit must have an inherent minimum delay so that the switch is never closed before point A as shown in FIG. 4C. This inherent delay corresponds to the tank phase that elapses between the tank peak and the point A. The inherent delay assures that the current will always decay to zero, as described above. The delay is determined in conjunction with the tank period, which of course depends on the values of the resonating capacitance and inductance.

The period of the one-shot multivibrator OSM is determined such that the pulse duration lies within a minimum and maximum limit. The minimum limit assures that the switch is closed sufficiently long for the maximum operating duty cycle so that winding current commutates naturally and is not interrupted. However, a maximum pulse length limit must also be recognized to avoid having the switch closed when the diode DP2 becomes forward biased before the next tank peak.

While particular embodiments of the invention have been shown and described, numerous modifications and alternate embodiments will occur to those skilled in the art. Accordingly, it is intended that the invention be limited only by the following claims.

What is claimed is:

1. A resonant power converter, comprising:
    at least one primary inductor connected for receiving an input supply voltage from a power source;
    at least one unidirectional switch connected to alternately enable and disable the flow of current through said primary inductor;
    a resonant tank circuit connected in series with said primary inductor, said tank circuit including:
    a resonant inductor having a primary inductive winding and a secondary inductive winding; and
    a resonant capacitor connected in parallel with said primary inductive winding;
    the switch enabling current flow through said primary inductor only in a direction from the power source to the tank circuit;
    a switch control connected to open and close said switch, said switch control closing said switch to achieve phase modulation after the voltage of the resonant tank circuit has passed a peak value at a polarity which urges current to flow from the power source to the tank circuit; and
    an output terminal connected in circuit with said secondary inductive winding.

2. The resonant power converter of claim 1, wherein said switch control is responsive to an output load at the output terminal to advance the phase of the initiation of current flow through the primary inductor as the output load increases.

3. The resonant power converter of claim 2, in which the switch control comprises frequency control means for advancing the phase of the initiation of current flow through the primary inductor as the output load increases by increasing a frequency at which the switch alternately enables and disables the flow of current through said primary inductor as the output load increases, and vice-versa.

4. The resonant power converter of claim 3, in which the frequency control means comprises:
    voltage controlled oscillator means connected to cause the switch to alternately enable and disable current flow through said primary inductor at an output frequency of the oscillator; and
    sensor means responsive to the voltage at the output terminal for causing the oscillator frequency to increase as the output load increases and the output voltage correspondingly decreases, and vice-versa.

5. The resonant power converter of claim 2, in which the switch control comprises delay control means for controlling the switch to delay the initiation of current flow through the primary inductor after the voltage of the resonant tank circuit has passed the peak value by a period which decreases as the output load increases, and vice-versa.

6. The resonant power converter of claim 5, in which the delay control means comprises:
    peak detector means for sensing when the voltage of the resonant tank circuit passes the peak value;
    a variable delay control unit for initiating current flow through the primary inductor after said period has elapsed after sensing of the peak value by the peak detector means; and
    sensor means responsive to the voltage at the output terminal for causing the delay control unit to decrease said period as the output load increases and the output voltage correspondingly decreases, and vice-versa.

7. The resonant power converter of claim 1, in which the switch control means is constructed to open said switch after a predetermined period of time has elapsed which is sufficient for current flow through said primary inductor to decrease to substantially zero after the switch control means closes said switch.

8. The resonant power converter of claim 1, wherein said switch control opens said switch to end current flow through said primary inductor in response to a near zero current condition in said switch.

9. The resonant power converter of claim 1, further comprising a rectifying means and an output capacitor connected in circuit with the secondary inductive winding and the output terminal to produce a smoothed DC signal at the output terminal in response to a pulsed signal on the secondary inductive winding.

10. The resonant power converter of claim 1, wherein the voltage signal output by said tank circuit has a substantially sinusoidal waveform.

11. The resonant power converter of claim 1, further comprising a smoothing capacitor in circuit connection with said switch for smoothing said input supply voltage.

12. The resonant power converter of claim 1, wherein the frequency of the voltage signal applied to said secondary inductive winding is twice the frequency of the voltage signal applied to said primary inductor.

13. A resonant power converter, comprising:
    at least one primary inductor connected for receiving an input supply voltage from a power source;

at least one unidirectional switch connected to alternately enable and disable the flow of current through said primary inductor;

an isolation transformer connected in series with said primary inductor, said transformer having a primary transformer winding and a secondary transformer winding magnetically coupled with said primary transformer winding;

a resonant tank circuit, including:

a resonant inductor having a primary inductive winding and a secondary inductive winding, said primary inductive winding connected in circuit with said secondary transformer winding;

a resonant capacitor connected in parallel with said primary inductive winding;

the switch enabling current flow through said primary inductor only in a direction from the power source to the resonant tank circuit;

a switch control connected to open and close said switch, said switch control closing said switch to achieve phase modulation after the voltage of the resonant tank circuit has passed a peak value at a polarity which urges current to flow from the power source to the resonant tank circuit; and an output terminal connected in circuit with said secondary inductive winding.

14. The resonant power converter of claim 13, wherein said switch control is responsive to an output load at the output terminal to advance the phase of the initiation of current flow through the primary inductor as the output load increases.

15. The resonant power converter of claim 13, wherein said switch control opens said switch to end current flow through said primary inductor in response to a near zero current condition in said switch.

16. The resonant power converter of claim 13, further comprising a rectifying means and an output capacitor connected in circuit with the secondary inductive winding and the output terminal to produce a smoothed DC signal at the output terminal in response to a pulsed signal on the secondary inductive winding.

17. The resonant power converter of claim 13, wherein the voltage signal output by said tank circuit has a substantially sinusoidal waveform.

18. The resonant power converter of claim 13, further comprising a smoothing capacitor in circuit connection with said switch for smoothing said input supply voltage.

19. The resonant power converter of claim 13, wherein the frequency of the voltage signal applied to said secondary inductive winding is twice the frequency of the voltage signal applied to said primary inductor.

20. A resonant power converter, comprising:

a transformer including:

at least one primary winding connected to receive an input supply voltage from a power source;

a tank winding magnetically coupled with said primary winding;

a resonant capacitor connected in parallel with said tank winding; and at least one output winding magnetically coupled with said tank winding;

at least one unidirectional switch connected to alternately enable and disable the flow of current through said primary winding;

the switch enabling current flow through said primary winding only in a direction from the power source to the tank winding;

a switch control connected to open and close said switch, said switch control closing said switch to achieve phase modulation after the voltage of the resonant tank circuit has passed a peak value at a polarity which urges current to flow from the power source to the tank winding; and at least one output terminal connected in circuit with said output winding;

said transformer having a gapped ferrite E-core with a center leg; the primary winding, the tank winding, and the output winding are wound on a split bobbin placed on the center leg of the E-core, with the primary winding and the tank winding being wound on separate sections of the split bobbin; and the output winding is wound closely coupled with the tank winding.

21. The resonant power converter of claim 20, further comprising a smoothing capacitor in circuit connection with said switch for smoothing said input supply voltage.

22. The resonant power converter of claim 20, further comprising a rectifying means and an output capacitor connected in circuit with said output winding and said output terminal to produce a smoothed DC signal at said output terminal in response to a pulsed signal on said output winding.

23. The resonant power converter of claim 20, further comprising voltage regulator means connected in series with said output terminal for regulating the voltage applied to said output terminal.

24. The resonant power converter of claim 20, wherein said at least one primary winding consists of a first and a second primary winding; and said at least one switch consists of a first and a second switch operated 180 degrees out of phase with each other in a push-pull manner, said first switch being series connected with said first primary winding and closing after the tank voltage has passed a peak value at a polarity which urges current to flow from the power source into the first primary winding, said second switch being series connected with said second primary winding and closing after the tank voltage has passed a peak value at a polarity which urges current to flow from the power source into the second primary winding.

25. The resonant power converter of claim 23, wherein said at least one switch consists of two switches operated about 180 degrees out of phase with each other; one switch closing after the tank voltage has passed a peak value at a polarity which urges current to flow from the power source into said one switch, and the other switch closing after the tank voltage has passed a peak value at a polarity which urges current to flow from the power source into said other switch; and said at least one primary winding consists of a single primary winding that is series connected with each of said two switches.

* * * * *